United States Patent
Hirokane et al.

Patent Number: 5,932,364
Date of Patent: Aug. 3, 1999

[54] MAGNETO-OPTICAL RECORDING MEDIUM, METHOD OF RECORDING AND REPRODUCING INFORMATION IN AND FROM SAID MAGNETO-OPTICAL RECORDING MEDIUM AND METHOD OF PRODUCING SAID MAGETO-OPTICAL RECORDING MEDIUM

[75] Inventors: Junji Hirokane, Nara; Hiroyuki Katayama, Sakura; Akira Takahashi, Nara; Kenji Ohta, Kitakatsuragi-gun, all of Japan

[73] Assignee: Sharp Kabushiki Kaisha, Osaka, Japan

[21] Appl. No.: 08/896,726

[22] Filed: Jul. 18, 1997

Related U.S. Application Data

[63] Continuation of application No. 08/477,482, Jun. 7, 1995, abandoned.

[30] Foreign Application Priority Data

Jul. 20, 1994 [JP] Japan .................................. 6-168274

[51] Int. Cl.[6] .................................. G11B 5/00; G11B 5/62
[52] U.S. Cl. .................................. 428/694 ML; 428/64.3; 428/694 EL; 428/694 RE; 369/13
[58] Field of Search .................... 428/694 ML, 694 SC, 428/694 LE, 694 MT, 694 RE, 694 MM, 694 EC, 694 TM, 64.3; 369/13, 272, 283, 288

[56] References Cited

U.S. PATENT DOCUMENTS

| | | | |
|---|---|---|---|
| 4,794,560 | 12/1988 | Bell et al. ................................ | 365/122 |
| 4,842,956 | 6/1989 | Kobayashi ............................ | 428/611 |
| 4,871,614 | 10/1989 | Kobayashi ............................ | 428/336 |
| 5,018,119 | 5/1991 | Aratani et al. ........................ | 369/13 |
| 5,094,925 | 3/1992 | Ise et al. ................................ | 428/694 |
| 5,420,833 | 5/1995 | Tanaka et al. ........................ | 369/13 |
| 5,428,585 | 6/1995 | Hirokane et al. .................... | 369/13 |
| 5,452,272 | 9/1995 | Murakami et al. .................. | 369/13 |
| 5,633,838 | 5/1997 | Hirokane ............................. | 369/13 |
| 5,640,374 | 6/1997 | Hirokane ............................. | 369/13 |
| 5,659,537 | 8/1997 | Hirokane ............................. | 369/275.2 |
| 5,684,764 | 11/1997 | Hirokane ............................. | 369/13 |

FOREIGN PATENT DOCUMENTS

| | | |
|---|---|---|
| 0 492 553 A2 | 7/1992 | European Pat. Off. . |
| 4-255941 | 9/1992 | Japan . |

Primary Examiner—John J. Zimmerman
Assistant Examiner—Michael LaVilla
Attorney, Agent, or Firm—David G. Conlin; William J. Daley, Jr.

[57] ABSTRACT

A magneto-optical recording medium according to the present invention comprises a recording layer in which information is to be recorded; and a reproducing layer to and from which information recorded in the recording layer is to be transferred and read out. The magneto-optical recording medium is arranged such that, at room temperature, the width of a stable magnetic domain of the reproducing layer is wider than the width of the recorded magnetic domain formed in the recording layer at the time when information has been recorded therein, and that, at temperature exceeding a predetermined value, the relationship between these widths is reversed. Accordingly, upon irradiation of a light beam, there is transferred and reproduced, to and from the reproducing layer, the magnetic domain of only that portion of the recording layer corresponding to the center portion of the light beam where the temperature of the reproducing layer exceeds the predetermined value. It is therefore possible to provide a magneto-optical recording medium in which information can be recorded with high density and which is suitable for recording image information or the like for which a large recording capacity is required.

32 Claims, 14 Drawing Sheets

MAGNETO-OPTICAL RECORDING MEDIUM, METHOD OF RECORDING AND REPRODUCING INFORMATION IN AND FROM SAID MAGNETO-OPTICAL RECORDING MEDIUM AND METHOD OF PRODUCING SAID MAGETO-OPTICAL RECORDING MEDIUM

This is a continuation of application Ser. No. 08/477,482 filed on Jun. 7, 1995 now abandoned.

FIELD OF THE INVENTION

The present invention relates to (i) a magneto-optical recording medium such as a magneto-optical recording disk, a magneto-optical recording tape, a magneto-optical recording card or the like to be applied to a magneto-optical recording apparatus, (ii) a method of recording and reproducing information in and from such a magneto-optical recording medium and (iii) a method of producing such a magneto-optical recording medium.

BACKGROUND OF THE INVENTION

A magneto-optical recording disk memory has been put to practical use as a rewritable optical memory. However, the conventional magneto-optical recording disk memory is disadvantageous in that the reproduction characteristics thereof are deteriorated when the diameter of a recorded bit and the distance between adjacent recorded bits become smaller than the diameter of a condensed semiconductor laser beam. This is because the adjacent recorded bits enter into the spot of a condensed laser beam, thereby to prevent each recorded bit from being reproduced as separated from the adjacent recorded bits.

To overcome such a defect, Japanese Patent Laid-Open Publication No. 4-255941 proposes a magnetic super resolution technology using a magneto-optical recording medium comprising a reproducing layer, an auxiliary reproducing layer and a recording layer. More specifically, this magneto-optical recording medium is previously initialized such that the magnetization direction in the reproducing layer is arranged in one direction, and the upstream and downstream recorded bits with respect to the light beam spot are then masked by the reproducing layer, such that each bit recorded at a pitch narrower than the width of the light beam spot, can be reproduced.

However, the technology above-mentioned requires a magnetic field for previously initializing the magnetization direction in the reproducing layer, causing the recording and reproducing apparatus to be increased in size.

In view of the foregoing, Japanese Patent Laid-Open Publication No. 5-81717 proposes a super resolution reproducing technology using a magneto-optical recording medium of a two-layer structure having (i) a reading layer which is an in-plane magnetized layer at room temperature and which becomes a perpendicularly magnetized layer with a rise in temperature, and (ii) a recording layer which is a perpendicularly magnetized layer. According to this technology, each recorded bit smaller than the diameter of a laser beam can be reproduced as separated from the adjacent recorded bits without the reproducing layer initialized.

In recording image information or the like, there is desired a recording and reproducing apparatus having a much larger capacity. In the conventional magneto-optical recording medium above-mentioned, however, information cannot disadvantageously be recorded with high density required for increasing the recording capacity.

SUMMARY OF THE INVENTION

It is a first object of the present invention to provide (i) a magneto-optical recording medium which is increased in recording capacity, which is excellent in C/N characteristics and which is suitable for high-density recording, and (ii) a method of producing such a magneto-optical recording medium.

It is a second object of the present invention to provide a recording and reproducing method capable of recording and reproducing information in and from a magneto-optical recording medium with high density and with excellent C/N characteristics.

To achieve the first object above-mentioned, the present invention provides a magneto-optical recording medium comprising: a recording layer in which information is to be recorded; and a reproducing layer to and from which information recorded in the recording layer is to be transferred and read out, the reproducing layer being arranged such that, at room temperature, the width of a stable magnetic domain thereof is wider than the width of the recorded magnetic domain formed in the recording layer at the time when information has been recorded therein, and that, at temperature exceeding a predetermined value, the width of the stable magnetic domain of the reproducing layer is not greater than the width of the recorded magnetic domain of the recording layer.

According to the arrangement above-mentioned, at room temperature, the width of a stable magnetic domain of the reproducing layer is greater than the width of the recorded magnetic domain of the recording layer. Accordingly, at the time of reproducing, the width of the stable magnetic domain of that portion of the reproducing layer to which no light beam is irradiated and in which temperature is not raised, is wider than the width of the recorded magnetic domain of the recording layer.

Accordingly, even though, in the portion above-mentioned in which temperature is not raised, a magnetic domain is transferred from the recording layer to the reproducing layer by magnetic coupling between the recorded magnetic domain of the recording layer and the magnetic domain of the reproducing layer, the magnetic domain transferred to the reproducing layer cannot stably be present and therefore disappears. On the other hand, in that portion of the reproducing layer to which a light beam is irradiated and in which temperature exceeds the predetermined value, the width of the stable magnetic domain becomes equal to or smaller than the width of the recorded magnetic domain. Accordingly, in the portion in which temperature exceeds the predetermined value, a magnetic domain is transferred from the recording layer to the reproducing layer by magnetic coupling between the recorded magnetic domain of the recording layer and the magnetic domain of the reproducing layer. Thus, a reproducible magnetic domain can stably be formed in the reproducing layer.

It is therefore possible to transfer and reproduce, to and from the reproducing layer, the information of magnetic domain of only that portion of the recording layer corresponding to the center portion of the light beam in which temperature exceeds the predetermined value by the irradiation of a light beam.

Accordingly, it is made possible to record information with high density required for increasing the recording capacity of a magneto-optical recording medium. Thus, there can be provided a magneto-optical recording medium suitable for recording image information or the like which requires a great recording capacity.

Further, there may be interposed, between the recording layer and the reproducing layer, an intermediate layer for changing, according to temperature, the intensity of magnetic coupling between the reproducing layer and the recording layer. Thus, there can be produced, with the use of any of a transit-type sputtering apparatus and a rotary-type sputtering apparatus, a magneto-optical recording medium in which the transfer of the magnetic domain of the recording layer to the reproducing layer can be weakened as necessary and in which the magnetic domain of only a necessary small portion of the recording layer can be transferred to the reproducing layer.

Further, the Curie temperature of the intermediate layer may be set to a level lower than the Curie temperature of the recording layer. In such an arrangement, when the temperature of the recording layer is raised to the Curie temperature thereof or more, the intermediate layer is also increased in temperature to the Curie temperature thereof or more such that the magnetization thereof disappears. Accordingly, when applying a recording magnetic field to the recording layer, the intermediate layer does not prevent the transfer of magnetization to the recording layer by the magnetic field. This results in reduction in intensity of the magnetic field required for recording.

To achieve the second object above-mentioned, the present invention provides a method of recording and reproducing information in and from a magneto-optical recording medium including: a recording layer in which information is to be recorded; and a reproducing layer to and from which information recorded in the recording layer is to be transferred and read out, the method comprising the steps of: using a magneto-optical recording medium arranged such that, at room temperature, the width of a stable magnetic domain of the reproducing layer thereof is wider than the width of the recorded magnetic domain formed in the recording layer thereof at the time when information has been recorded in the recording layer, and that, with a rise in temperature to a predetermined value, the width of the stable magnetic domain becomes not greater than the width of the recorded magnetic domain; and setting the intensity of a light beam irradiated to the magneto-optical recording medium, in the range (i) which is not less than the level at which the temperature of the reproducing layer is raised to the predetermined value, causing a recorded bit to be reproduced, to be transferred to the reproducing layer, and (ii) which is smaller than the level which causes the recorded bits adjacent to the recorded bit to be reproduced, to be transferred to the reproducing layer.

Accordingly, the temperature of only that portion of the reproducing layer at the center of the light beam, exceeds the predetermined value. The information of only one of the bits recorded at high density, can be transferred to the reproducing layer and reproduced therefrom. This restrains crosstalk from the recorded bits adjacent to the recorded bit to be reproduced, thus enabling the information to be reproduced with excellent C/N characteristics. It is therefore possible to reproduce, in a good manner, information from a magneto-optical recording medium in which there has been recorded, with high density, information such as image information for which a large recording capacity is required.

To achieve the first object above-mentioned, the present invention also provides a method of producing a magneto-optical recording medium comprising the step of: using a transit-type sputtering apparatus including (i) a target for irradiating, onto a substrate, a sputtering material for forming a recording layer in which information is to be recorded, and (ii) a target for irradiating, onto the substrate, a sputtering material for forming a reproducing layer to and from which information recorded in the recording layer is to be transferred and read out, the apparatus being arranged such that the substrate is passed in the vicinity of each of the targets, whereby there is formed a magneto-optical recording medium arranged such that, at room temperature, the width of a stable magnetic domain of the reproducing layer is wider than the width of the recorded magnetic domain formed in the recording layer at the time when information has been recorded therein, and that, with a rise in temperature to a predetermined value, the width of the stable magnetic domain becomes not greater than the width of the recorded magnetic domain.

Accordingly, the substrate is passed in the vicinity of the targets, respectively, at the time when forming the reproducing layer and at the time when forming the recording layer. Thus, when the substrate is moved toward and away from each of the targets, each of the sputtering materials is obliquely irradiated to the substrate. On the other hand, when the substrate is located in a position directly opposite to each of the targets, each of the sputtering material is irradiated to the substrate substantially at a right angle thereto. The magneto-optical recording medium thus produced is essentially of a two-layer structure having the reproducing layer and the recording layer. However, an unmeasurable distribution of composition is present in each of the layers. Therefore, there are present, at the interface of the reproducing layer and the recording layer, magnetic characteristics different from the average magnetic characteristics of each of the layers. This weakens the magnetic coupling between the reproducing layer and the recording layer.

Accordingly, the transfer of a magnetic domain of the recording layer to the reproducing layer can be controlled or weakened as necessary. Thus, the magnetic domain of only a necessary small portion of the recording layer can be transferred to the reproducing layer. Therefore, the medium producing method of the present invention can produce a magneto-optical recording medium having a large capacity and suitable for high-density recording.

These and other features, objects and advantages of the present invention will be more fully apparent from the following detailed description set forth below when taken in conjunction with the accompanying drawings.

BRIEF DESCRIPTION OF THE DRAWINGS

FIG. 20 (b) is a section view of FIG. 20 (a).

DESCRIPTION OF THE EMBODIMENTS

First Embodiment

The following description will discuss a first embodiment of the present invention.

Figure 2:
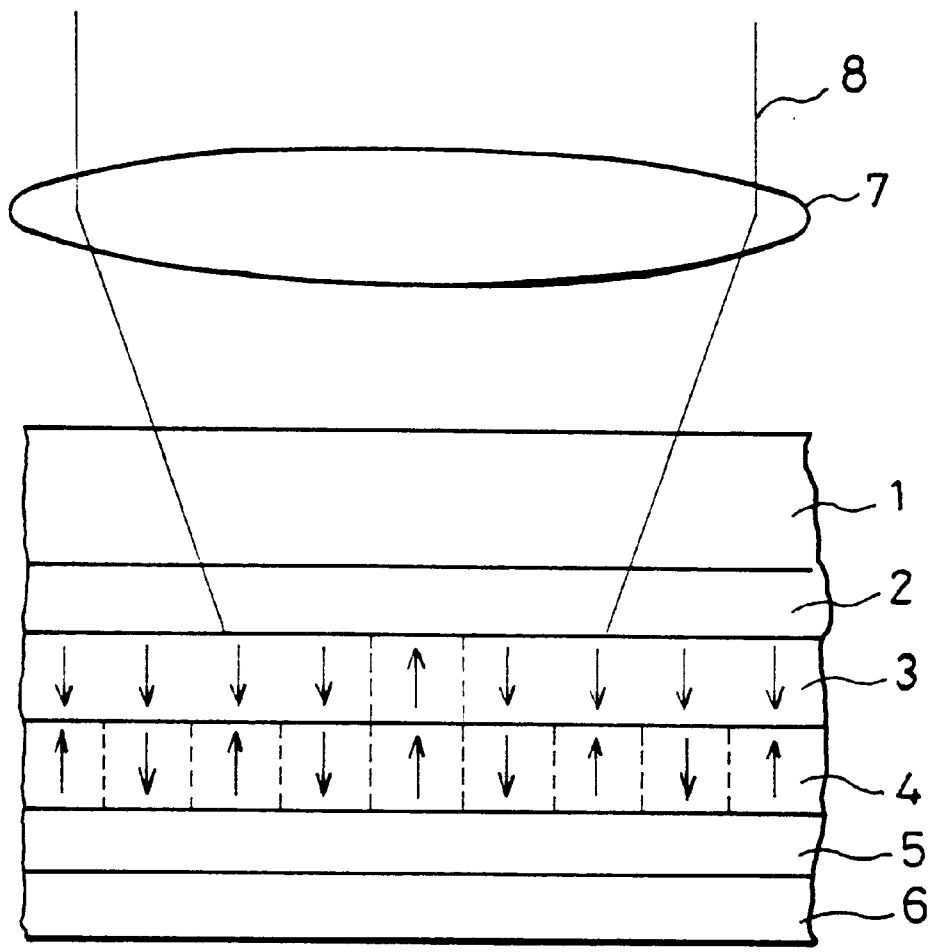
FIG. 2 is a view illustrating the arrangement of the magneto-optical recording medium shown in FIGS. 1(a) and (b)

As shown in FIG. 2, a magneto-optical recording medium according to the first embodiment has an arrangement in which there are laminated a substrate 1, a transparent dielectric layer 2, a reproducing layer 3, a recording layer 4, a protective layer 5 and an overcoat layer 6 in this order. Provision is made such that an object lens 7 is stopped down to irradiate a light beam 8 to the reproducing layer 3, such that information is recorded and reproduced in and from the magneto-optical recording medium.

Figure 1A:
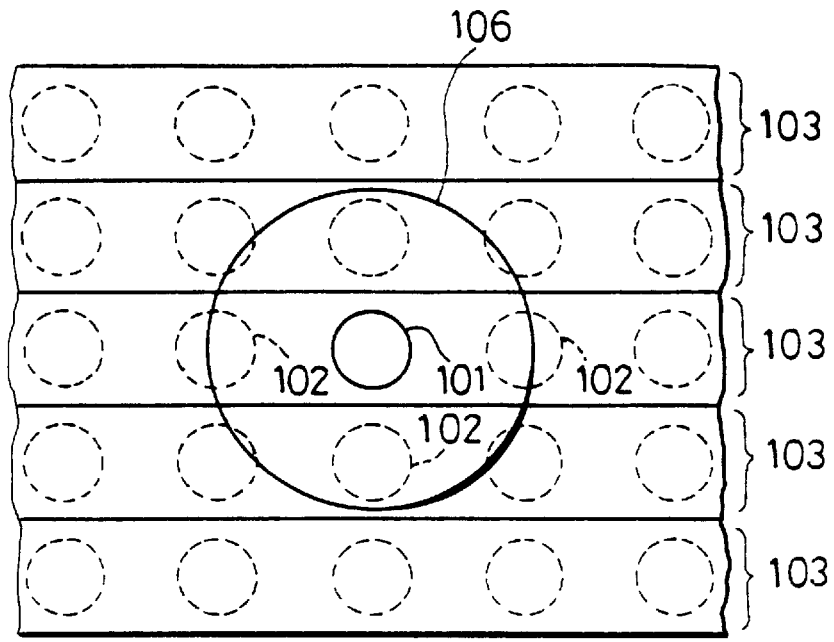
FIG. 1(a) is a plan view illustrating a method of reproducing information from a magneto-optical recording medium according to an embodiment of the present invention.
Figure 1B:
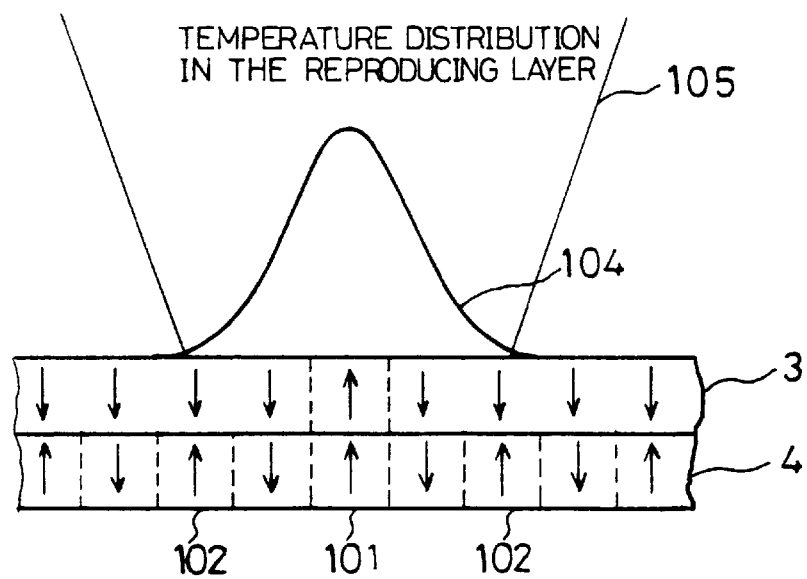
FIG. 1(b) is a section view of FIG. 1(a)

FIGS. 1(a) and (b) illustrate a magnetic super resolution reproducing technology in the magneto-optical recording medium according to the first embodiment. For comparison, FIGS. 20(a) and (b) show a conventional magnetic super resolution reproducing technology disclosed in Japanese Patent Laid-Open Publication No. 5-81717.

Figure 20A:
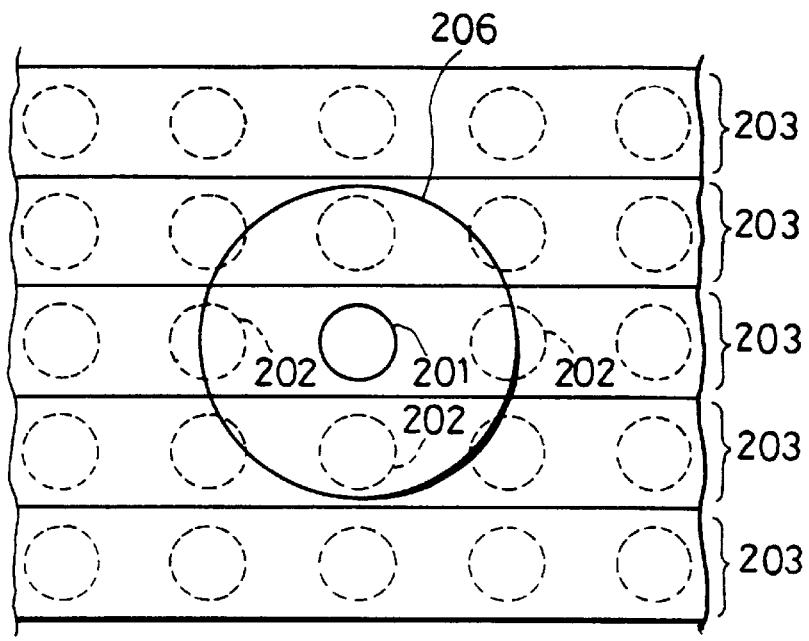
FIG. 20 (a) is a plan view illustrating a method of reproducing information from a conventional magneto-optical recording medium.
Figure 20B:
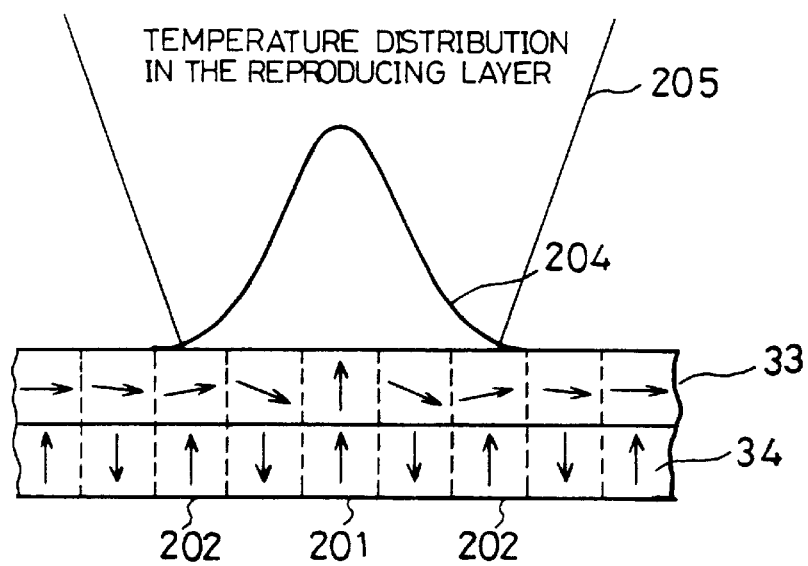

First, the description will be made in connection with FIGS. 20(a) and (b). Recorded bits 201, 202 are formed along tracks 203 formed on a substrate. In such a state, a condensed light beam is irradiated to a reproducing layer 33, and a temperature distribution 204 is generated on the reproducing layer 33 and a recording layer 34 according to the intensity distribution of the condensed light beam. The reproducing layer 33 presents in-plane magnetization characteristics at room temperature and presents perpendicular magnetization characteristics with a rise in temperature.

A Kerr effect serving as the reproduction principle in the magneto-optical recording medium is produced only by a perpendicularly magnetized component. More specifically, there is perpendicularly magnetized only that portion of the magneto-optical recording medium to which the condensed light beam is irradiated, i.e., only that portion of the reproducing layer 33 at the center portion of a light beam spot 206 which has been increased in temperature. Thus, a reproduced signal can be obtained from that portion of the reproducing layer 33 at the center portion of the light beam spot 206. As a result, the magnetization of only that portion of the recording layer 34 at the recorded bit 201 located in the center portion of the light beam spot 206, is transferred to the reproducing layer 33 by a magnetic coupling. Those portions of the reproducing layer 33 corresponding to other recorded bits 202 than the recorded bit 201, are brought into an in-plane magnetized state. This enables only the information of the recorded bit 201 to be reproduced, such that information recorded at high density can be read out.

However, the reproducing layer 33 of the prior art is generally gradually changed in magnetization state from in-plane magnetization to perpendicular magnetization with a rise in temperature, and the recorded bits 202 adjacent to the recorded bit 201 to be reproduced are also increased in temperature to a certain extent. Accordingly, the magnetization of the reproducing layer 33 corresponding to the adjacent recorded bits 202 is in the middle course of change in magnetization where the magnetization direction is inclined and where a perpendicularly magnetized component is contained.

This results in simultaneous reproduction of the perpendicularly magnetized components of the adjacent recorded bits 202 and the information of the recorded bit 201 to be reproduced. This prevents the reproduced signal of the recorded bit 201 from being detected as perfectly separated from the adjacent recorded bits 202.

In the magneto-optical recording medium according to the first embodiment, the stability of the magnetic domain of the reproducing layer 3 is utilized such that the information of a recorded bit 101 to be reproduced is detected as perfectly separated from the information of each of adjacent recorded bits 102, as shown in FIGS. 1(a) and (b). Thus, the magnetic super resolution technology is achieved. In FIGS. 1(a) and (b), the recorded bits 101, 102 are formed along tracks 103 formed on the substrate likewise in FIGS. 20(a) and (b). In such a state, a condensed light beam 105 is irradiated to the reproducing layer 3, and a temperature distribution 104 is generated on the reproducing layer 3 and the recording layer 4 according to the intensity distribution of the condensed light beam. The reproducing layer 3 and the recording layer 4 are formed such that, at room temperature, the width of the stable magnetic domain of the reproducing layer 3 is greater than the width of the recorded magnetic domain of the recording layer 4, and that, with a rise in temperature to a predetermined value, the width of the stable magnetic domain of the reproducing layer 3 is equal to or smaller than the width of the recorded magnetic domain of the recording layer 4.

Accordingly, in the center portion of a light beam spot 106 in which temperature rise exceeds the predetermined value, the width of the stable magnetic domain of the reproducing layer 3 is equal to or smaller than the width of the recorded magnetic domain of the recording layer 4. Thus, a reproducible magnetic domain is stably formed in the reproducing layer 3. That is, the reproducible magnetic domain is formed such that the recorded magnetic domain of the recording layer 4 is magnetically coupled with the magnetic domain of the reproducing layer 3, thereby to transfer the information of the recorded bit 101 of the recording layer 4 to the reproducing layer 3.

On the other hand, in other portion of the light beam spot 106 in which temperature has not been increased to the predetermined value, the width of the stable magnetic domain of the reproducing layer 3 is greater than the width of the recorded magnetic domain of the recording layer 4. Accordingly, even though the information of each of the recorded bits 102 of the recording layer 4 is transferred to the reproducing layer 3 by a magnetic coupling, the magnetic domain formed on the reproducing layer 3 by such transfer cannot be present in a stable manner or disappears. Accordingly, the information of each of the recorded bits 102 is not transferred to those portions of the reproducing layer 3 corresponding to the recorded bits 102. Thus, those portions of the reproducing layer 3 corresponding to the recorded bits 102, are magnetized in the direction identical with the magnetization direction of the surroundings of the recorded bits 102, i.e., in the direction opposite to the magnetization direction of the recorded bits 102.

As thus discussed, there is transferred, to the reproducing layer 3, the information of magnetic domain of only the recorded bit 101 at the center of the light beam spot 106 in which temperature rise exceeds the predetermined value by the irradiation of a light beam. Thus, the information of the recorded bit 101 to be reproduced can be detected as perfectly separated from the information of each of the adjacent recorded bits 102. Accordingly, information can be recorded with such high density as required for increasing the recording capacity. Thus, there can sufficiently be recorded image information or the like for which a large-capacity recording and reproducing apparatus is required.

The following description will discuss a method of producing the magneto-optical recording medium having the arrangement above-mentioned.

A substrate 1 made of polycarbonate having pregrooves and prepits was placed on a holder in a transit-type sputtering apparatus having three targets made of Al, a GdFeCo alloy and a DyFeCo alloy, respectively. After the sputtering apparatus had been evacuated up to $1 \times 10^{-6}$ Torr, a mixture gas of argon and nitrogen was introduced in the sputtering apparatus and electric power was supplied to the Al target. Under a gas pressure of $4 \times 10^{-3}$ Torr, the holder having the substrate 1 placed thereon was moved and passed on the Al target to form a transparent dielectric layer 2 made of AlN. To improve the reproduction characteristics, the thickness of the transparent dielectric layer 2 was set approximately to a value as obtained by dividing ¼ of the wavelength of the reproducing light by the refractive index of the layer 2. When it is now supposed that the wavelength of the reproducing light is 680 nm, it is enough that the thickness of the layer 2 is about 10 nm to 68 nm. In the first embodiment, the thickness of the layer 2 was set to 50 nm.

Then, after the sputtering apparatus had been again evacuated up to $1 \times 10^{-6}$ Torr, argon gas was introduced therein and electric power was supplied to the target of GdFeCo alloy. Under a gas pressure of $4 \times 10^{-3}$ Torr, the holder having the substrate 1 placed thereon was moved to form a reproducing layer 3 of $Gd_{0.22}(Fe_{0.60}Co_{0.40})_{0.78}$ having a thickness of 50 nm. As compared with the compensation composition, the reproducing layer 3 thus formed had a TM-rich composition always containing more TM (transition) metal than RE (rare earth) metal. This reproducing layer 3 had a Curie point of 420° C.

Then, the feed of electric power to the GdFeCo-alloy target was stopped, and electric power was fed to the DyFeCo-alloy target. Under the same conditions as above-mentioned, there was formed a recording layer 4 made of $Dy_{0.23}(Fe_{0.78}Co_{0.22})_{0.77}$ having a thickness of 50 nm. This recording layer 4 was a perpendicularly magnetized layer having a compensation point approximately at room temperature. The recording layer 4 had a Curie point of 200° C.

Then, a mixture gas of argon and nitrogen was introduced into the sputtering apparatus and electric power was supplied to the Al target. Under a gas pressure of $4 \times 10^{-3}$ Torr, there was formed a protective layer 5 of AlN in a manner similar to that above-mentioned. It is enough that the thickness of the protective layer 5 is set such that the magnetic layers are protected from corrosion such as oxidation or the like. In the first embodiment, the thickness of the protective layer 5 was set to 20 nm.

Then, ultraviolet-setting resin or thermosetting resin was applied to the protective layer 5 by spin-coating, and ultraviolet rays were irradiated to the ultraviolet-setting resin layer or the thermosetting resin layer was heated, thereby to form an overcoat layer 6.

Figure 3:
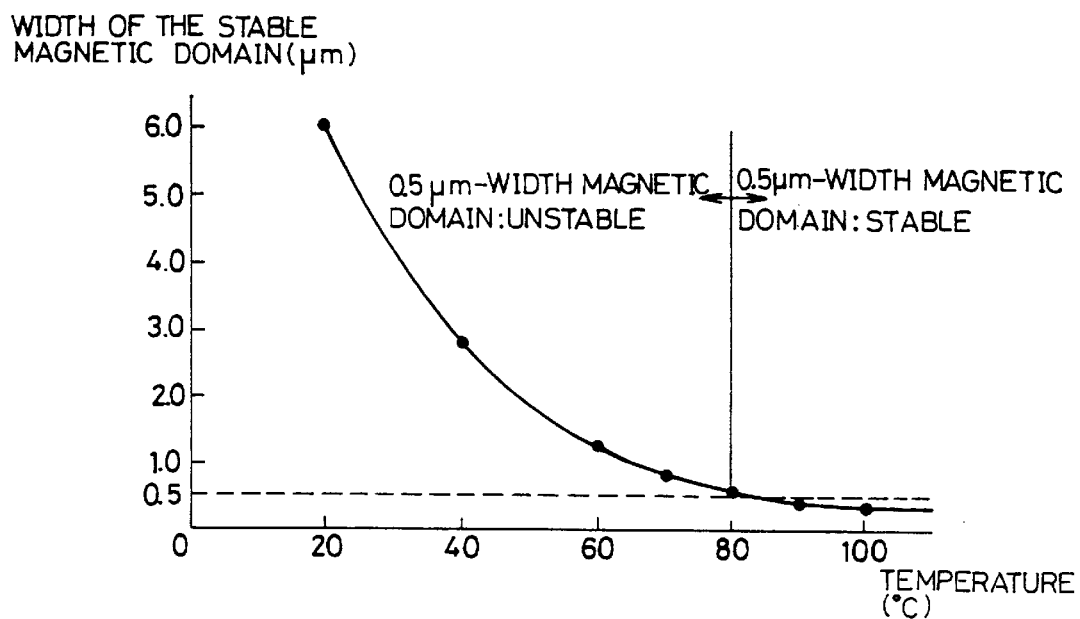
FIG. 3 is a graph showing the magnetic characteristics of the magneto-optical recording medium in FIGS. 1(a) and (b)

Also, there was prepared, as a sample, a magneto-optical recording medium having only a reproducing layer 3 and a protective layer 5 each formed in a manner similar to that above-mentioned. FIG. 3 shows the temperature dependency of the width of the stable magnetic domain of the reproducing layer 3 in this sample. It is apparent from FIG. 3 that the width of the stable magnetic domain becomes narrower with a rise in temperature. It is also apparent that a magnetic domain as narrow as 0.5 μm is not stably present in the reproducing layer 3 at room temperature and that such a narrow magnetic domain is stably present when the temperature exceeds a predetermined value, for example about 80° C.

Figure 4:
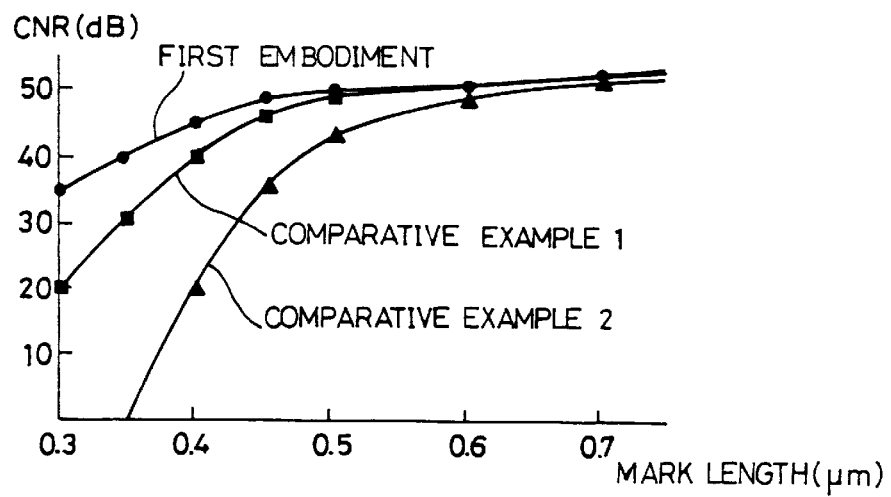
FIG. 4 is a graph showing recording and reproduction characteristics of the magneto-optical recording medium in FIGS. 1(a) and (b)

The magneto-optical recording medium formed in the first embodiment was investigated for recording and reproduction characteristics. FIG. 4 shows the dependency of CNR (signal/noise ratio) on mark length in the magneto-optical recording medium of the first embodiment. After the magnetization direction of the recording layer 4 had been arranged in one direction, laser light of 6 mW power was irradiated, in the form of pulses, to the magneto-optical recording medium with the linear velocity thereof set to 5 m/s and with the intensity of the recording magnetic field set to 75 kA/m. Thus, there were formed recorded bits with different mark lengths and with pitches each of which was equal to twice each mark length. Then, there were measured the CNRs with reproducing laser power of 2 mW. For comparison, there was also measured in a similar manner a magneto-optical recording medium, as Comparative Example 1, having the arrangement shown in FIGS. 20(a) and (b) where $Gd_{0.26}(Fe_{0.82}Co_{0.18})_{0.74}$ was used as the reproducing layer 33. The measurement results are also shown in FIG. 4.

In Comparative Example 1, the information of each of adjacent recorded bits 202 enters the information of the recorded bit 201 to be reproduced. In the first embodiment, those portions of the reproducing layer 3 corresponding to the adjacent recorded bits 102 are perfectly identical in magnetization direction with the surroundings. Thus, the information of each of the adjacent recorded bits 102 does not enter the information of the recorded bit 101 to be reproduced. Accordingly, as compared with Comparative Example 1, much higher CNRs could be obtained in a zone where the mark length is shorter.

It is understood in FIG. 4 that the magneto-optical recording medium of the first embodiment presents a good CNR of 35 dB in the recorded bits formed with a mark length of 0.3 μm and a mark pitch of 0.6 μm. These CNR measurements were made with an optical system using laser having a wavelength of 830 nm. In ordinarily recorded bits formed with a mark length of 0.3 μm and a mark pitch of 0.6 μm, a recorded bit to be reproduced cannot be separated at all from adjacent recorded bits. More specifically, the CNR is equal to zero for the bits ordinarily recorded with a mark length of 0.3 μm and with a mark pitch of 0.6 μm. The fact that some CNR was obtained in such a state, means that the magnetic super resolution phenomenon of the first embodiment was achieved.

Figure 5:
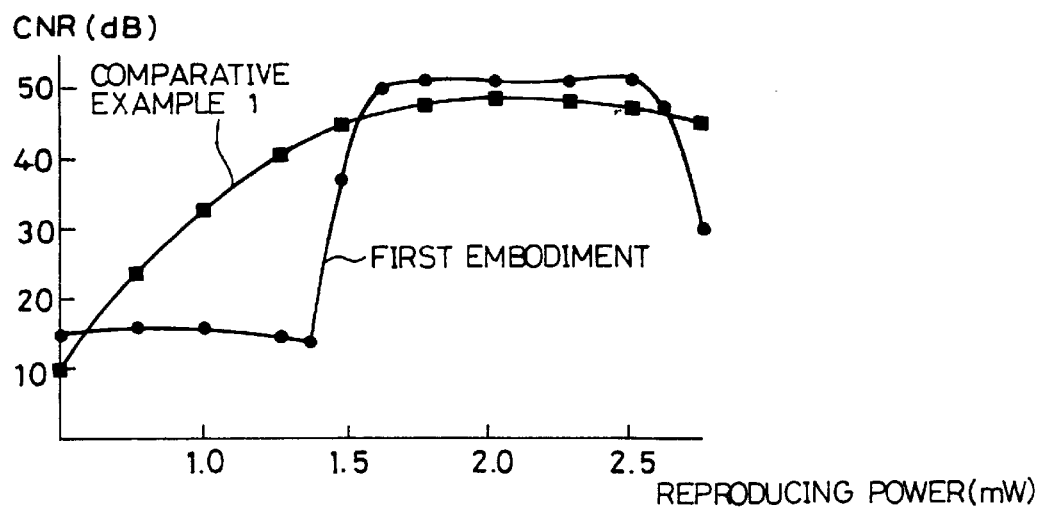
FIG. 5 is a graph showing recording and reproduction characteristics of the magneto-optical recording medium in FIGS. 1(a) and (b)

FIG. 5 shows the dependency of CNR on reproducing power in the recorded bits formed with a mark length of 0.5 μm and a mark pitch of 1.0 μm. In Comparative Example 1, the magnetization is gradually changed in direction from the in-plane magnetization to the perpendicular magnetization. Accordingly, the CNR is gradually increased with an increase in reproducing power. On the other hand, the CNR in the first embodiment is suddenly increased at the reproducing power of about 1.4 mW. More specifically, such a sudden rise in CNR takes place because only one recorded bit is transferred to the reproducing layer 3 at the point of time when, with an increase in reproducing power, the reproducing layer 3 is increased in temperature such that the width of the stable magnetic domain of the reproducing layer 3 becomes smaller than the width of the recorded magnetic domain.

In a low power zone, some CNR is observed. This is because light transmitting through the reproducing layer 3, reproduces signals from recorded bits of the recording layer 4.

Thus, according to the first embodiment, a signal cannot satisfactorily be reproduced unless the reproducing power is set to a level not less than the power value with which a recorded bit can be transferred. In other words, it is required to set the reproducing power to a level at which the reproducing layer 3 can be increased in temperature to the extent that the width of the stable magnetic domain becomes smaller than the width of the recorded magnetic domain.

Further, when the reproducing power is further increased, the CNR is suddenly lowered. This is because the transfer of a recorded bit occurs also in adjacent recorded bits. In the magneto-optical recording medium of the first embodiment, the reproducing power is required to be not less than the value with which a recorded bit to be reproduced can be transferred to the reproducing layer 3, and the reproducing power is also required to be smaller than the value with which the transfer of any of adjacent recorded bits starts. It is therefore possible to transfer and reproduce, to and from the reproducing layer 3, only the information of magnetic domain of the recording layer 4 corresponding to the center portion of the light beam in which temperature rise has exceeded a predetermined value by the irradiation of a light beam. Accordingly, information can be recorded with such high density as required for increasing the recording capacity. Thus, there can sufficiently be recorded image information or the like for which a large-capacity recording and reproducing apparatus is required.

Using a rotary-type sputtering apparatus, there was also prepared, as Comparative Example 2, a magneto-optical recording medium which had a reproducing layer and a recording layer, and which had the same arrangement as the first embodiment. There was measured the dependency of CNR on mark length in the magneto-optical recording medium thus prepared. The measurement results are shown in FIG. 4. In Comparative Example 2, no magnetic super resolution phenomenon is obtained and the CNR is suddenly lowered as the mark length is shortened, likewise in a magneto-optical recording medium having only a recording layer. This means that, in a magneto-optical recording medium which is similar in arrangement to that of the first embodiment and which was prepared using a rotary-type sputtering apparatus, the information of each of recorded bits 102 was transferred to the reproducing layer such that the information of the recorded bit 101 to be reproduced could not be reproduced as separated from the information of each of the adjacent recorded bits 102.

Figure 6:
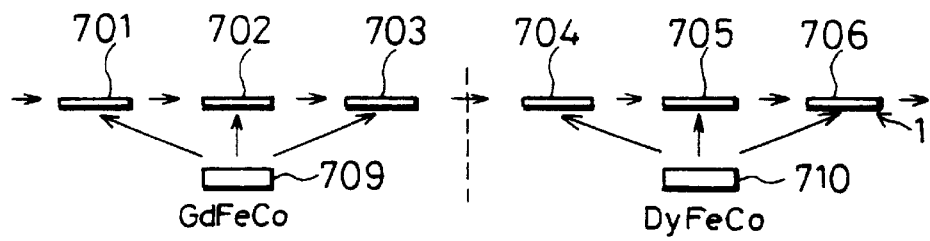
FIG. 6 is a view illustrating a method of producing the magneto-optical recording medium in FIGS. 1(a) and (b)
Figure 7:
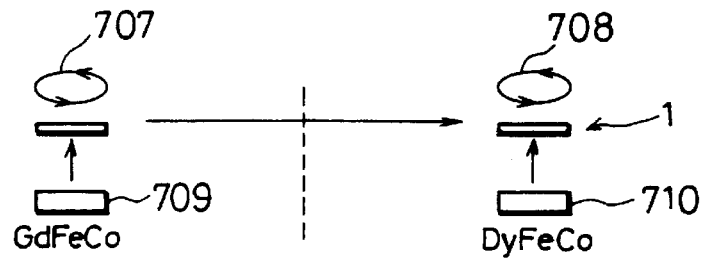
FIG. 7 is a view illustrating a method of producing the magneto-optical recording medium in FIGS. 1(a) and (b)

FIGS. 6 and 7 illustrate the difference between magnetic layers respectively formed with a transit-type sputtering apparatus and a rotary-type sputtering apparatus. For simplification, the following description will discuss only the steps of forming a reproducing layer and a recording layer.

In the transit type, a substrate 1 attached to a holder is moved in one direction on a GdFeCo-alloy target 709 from a position 701 to a position 703 through a position 702, thereby to form a reproducing layer. Then, to form a recording layer, the substrate 1 is moved in one direction on a DyFeCo-alloy target 710 from a position 704 to a position 706 through a position 705.

When considering the formation of the reproducing layer, it is understood that there is a difference in state between the position 702 and each of the positions 701, 703. More specifically, the substrate 1 is perfectly opposite to the GdFeCo-alloy target 709 at the position 702 such that GdFeCo is horizontally formed on the substrate 1. On the other hand, at each of the positions 701 and 703, the substrate 1 is located in a position remote from the GdFeCo-alloy target 709 such that GdFeCo is inclinedly formed on the substrate 1.

The foregoing also applies to the DyFeCo-alloy target 710 used for forming the recording layer.

Thus, even though a magneto-optical recording medium prepared with a transit-type sputtering apparatus, is substantially of the two-layer structure of a reproducing layer and a recording layer, in the vicinity of the interface between the reproducing layer and the recording layer, the composition of each layer has a composition gradation that weakens the magnetic coupling between the reproducing layer and the recording layer at about room temperature. In other words, in the vicinity of the interface, the magnetic characteristics of each layer are different from the average magnetic characteristics of the respective layers. It is therfore possible to control the transfer such that the transfer of a magnetic domain of the recording layer to the reproducing layer is restrained as necessary, for example when the temperature is low. As a result, the transfer of information from the recording layer hardly occurs at other than that portion of the recording layer corresponding to the center portion of a light beam. Therefore, it is possible to transfer, to the reproducing layer, the magnetic domain of only a necessary small portion of the recording layer i.e., only at that portion of the recording layer corresponding to the center portion of a light beam. Thus, the effect of restraining the entry of noise can further be enhanced in that the composition of the reproducing layer 3 has been selected such that the width of the stable magnetic domain thereof is narrower with a rise in temperature, and in that the use of the transit-type sputtering apparatus has weakened the magnetic coupling at room temperature.

On the other hand, with a rotary-type sputtering apparatus, a substrate 1 attached to a holder is rotated at a position 707 on a GdFeCo-alloy target 709 to form a reproducing layer. Then, to form a recording layer, the substrate 1 is rotated at a position 708 on a DyFeCo-alloy target 710. Thus, no irregular composition is present in each of the reproducing layer and the recording layer of the magneto-optical recording medium prepared with the rotary-type sputtering apparatus. Accordingly, the magnetic coupling between the reproducing and recording layers is strong.

As thus discussed, the magneto-optical recording medium of the first embodiment presents a magnetic super resolution phenomenon because the magnetic domain of the reproducing layer is stable and because the reproducing layer and the recording layer are magnetically coupled with each other with suitable intensity. Further, a magneto-optical recording medium capable of achieving high-density recording and high CNR, can be prepared with a transit-type sputtering apparatus with which the magnetic coupling between the reproducing and recording layers can be weakened, but such a magneto-optical recording medium cannot be prepared with a rotary-type sputtering apparatus with which the magnetic coupling between the reproducing and recording layers is strong.

In the first embodiment, there has been discussed, for the reproducing layer in the present invention, GdFeCo which is considered to provide the best reproduction characteristics. According to the spirit of the present invention, however, the material of the reproducing layer is not limited to GdFeCo. Other than GdFeCo, there may be used, as the material of which width of the stable magnetic domain varies with a rise in temperature, a rare earth transition metal alloy such as TbFeCo, DyFeCo, HoFeCo, GdTbFeCo, GdDyFeCo, GdHoFeCo or the like.

Further, there is now shown a trend to use a semiconductor laser as a light source of which wavelength is shorter. By adding, to the reproducing layer, a trace amount of at least one element of Nd, Pt, Pr and Pd elements, the angle of polar Kerr rotation for a short-wavelength light can be increased with no reduction in the characteristics required for the reproducing layer. Accordingly, even though a short-wavelength laser is used, there can be obtained a reproduced signal of high quality.

Further, in the first embodiment, DyFeCo has been discussed for the recording layer in the present invention. According to the spirit of the present invention, however, the material of the recording layer is not limited to DyFeCo. Other than DyFeCo, there may be used a material used for a conventional magneto-optical disk, i.e., a rare earth transition metal alloy such as TbFeCo, GdDyFe, GdTbFeCo, GdDyFeCo or the like.

Further, by adding, to each of the reproducing and recording layers of the first embodiment, a trace amount of at least one element out of Cr, V, Nb, Mn, Be and Ni elements, each layer is improved in resistance to environment. More specifically, such an addition restrains each layer from being deteriorated in characteristics due to oxidation of the material caused by the entry of moisture or oxygen, thereby to provide a magneto-optical recording medium excellent in long-term reliability.

Further, in the first embodiment, AlN has been discussed for the transparent dielectric layer and the protective layer in the present invention. However, the material of the transparent dielectric layer and the protective layer is not limited to this AlN. The transparent dielectric layer is required not only to enhance the Kerr effect utilizing light interference, but also to prevent the entry of oxygen or moisture from the outside. There may be used a transparent dielectric layer made of Sin, AlSiN, AlTaN, SiAlON, TiN, TiON, BN, $TiO_2$, $BaTiO_3$, $SrTiO_3$, ZnS or the like, other than AlN. Of these, each of SiN, AlSiN, AlTaN, SiAlON, TiN, BN and ZnS does not contain oxygen as a component. Accordingly, with the use of each of such elements, there can be provided a magneto-optical recording medium particularly excellent in resistance to moisture. On the other hand, the protective layer is required only to prevent the entry of oxygen or moisture from the outside. Thus, there may be employed, as the protective layer, an opaque layer made of Cr, Ta or the like excellent in resistance to moisture, other than the transparent dielectric layer.

In the magneto-optical recording medium of the first embodiment, there may be formed, for example, a heat releasing layer of Al having a thickness of about 100 nm between the recording layer 4 and the protective layer 5 or between the protective layer 5 and the overcoat layer 6. In such an arrangement, heat generated in the magneto-optical recording medium when subjected to recording, can be released in the thickness direction. This reduces a spread of heat in the direction of the layer surface such that the temperature distribution in the magneto-optical recording medium becomes sharper. This enables recorded bits to be uniformed in shape. As the material of the heat releasing layer, there may be used a material of which thermal conductivity is greater than that of the recording layer. Thus, a material such as Au, Ag, Cu, SUS, Ta, Cr or the like is preferably used.

Second Embodiment

The following description will discuss a second embodiment of the present invention. For convenience sake, like parts in the second embodiment will be designated by like reference numerals used in the first embodiment, and the detailed description thereof will be omitted here.

Figure 8:
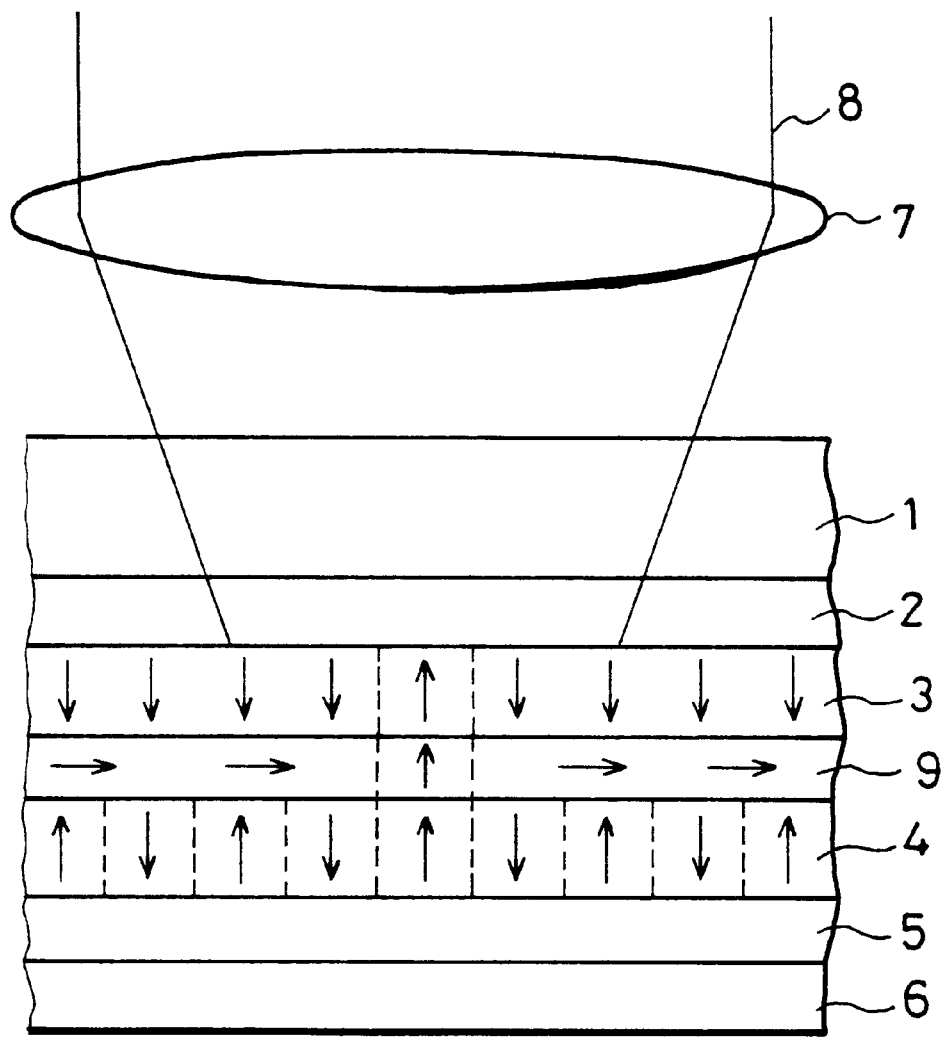
FIG. 8 is a view illustrating the arrangement of a magneto-optical recording medium according to another embodiment of the present invention.

As shown in FIG. 8, a magneto-optical recording medium according to the second embodiment has an arrangement in which there are laminated a substrate 1, a transparent dielectric layer 2, a reproducing layer 3, an intermediate layer 9, a recording layer 4, a protective layer 5 and an overcoat layer 6 in this order. The intermediate layer 9 has the property of presenting in-plane magnetization and is disposed for forcibly controlling the magnetic coupling between the reproducing layer 3 and the recording layer 4.

The magneto-optical recording medium of the second embodiment was prepared in the following manner.

A substrate 1 made of polycarbonate having pregrooves and prepits was placed on a holder in a rotary-type sputtering apparatus having five targets made of Al, Gd, Fe, Co, Dy, respectively. After the sputtering apparatus had been evacuated up to $1 \times 10^{-6}$ Torr, a mixture gas of argon and nitrogen was introduced in the sputtering apparatus and electric power was supplied to the Al target. Under the conditions of a gas pressure of $4 \times 10^{-3}$ Torr and a sputtering speed of 12 nm/min., the holder having the substrate 1 placed thereon was rotated to form a transparent dielectric layer 2 made of AlN. To improve the reproduction characteristics, the thickness of the transparent dielectric layer 2 was set approximately to a value as obtained by dividing ¼ of the wavelength of the reproducing light by the refractive index of the layer 2. When it is now supposed that the wavelength of the reproducing light is 680 nm, it is enough that the thickness of the layer 2 is set in the range of about 10 nm to about 68 nm. In the second embodiment, the thickness of the layer 2 was set to 50 nm.

Then, after the sputtering apparatus had been again evacuated up to $1 \times 10^{-6}$ Torr, argon gas was introduced therein and electric power was supplied to each of the respective targets of Gd, Fe and Co. Under the conditions of a gas pressure of $4 \times 10^{-3}$ Torr and a sputtering speed of 15 nm/min., there was formed a reproducing layer 3 of $Gd_{0.22}(Fe_{0.60}Co_{0.40})_{0.78}$ having a thickness of 50 nm. The reproducing layer 3 thus formed had a TM-rich composition in which the concentration ratio of TM (transition) metal to RE (rare earth) metal is greater than that of a compensation composition. This reproducing layer 3 had a Curie point of 420° C.

Then, the electric power to be fed to each of the targets was adjusted, and there was formed, under conditions similar to those above-mentioned, an intermediate layer 9, which is a in-plane magnetized layer made of $Gd_{0.42}(Fe_{0.60}Co_{0.40})_{0.58}$ having a thickness of 10 nm.

Then, the feed of electric power to the Gd target was stopped and electric power was fed to the Dy target. Under conditions similar to those above-mentioned, there was formed a recording layer 4 made of $Dy_{0.23}(Fe_{0.78}Co_{0.22})_{0.77}$ having a thickness of 50 nm. This recording layer 4 was a perpendicularly magnetized layer having a compensation point approximately at room temperature. The recording layer 4 had a Curie point of 200° C.

Then, a mixture gas of argon and nitrogen was introduced into the sputtering apparatus and electric power was supplied to the Al target. Under the conditions of a gas pressure of $4 \times 10^{-3}$ Torr and a sputtering speed of 12 nm/min., there was formed a protective layer 5 of AlN in a manner similar to that above-mentioned. It is enough that the thickness of the protective layer 5 is set such that the magnetic layers are protected from corrosion such as oxidation or the like. In the second embodiment, the thickness of the protective layer 5 was set to 20 nm. An overcoat layer 6 was formed in a manner similar to that in the first embodiment.

Figure 9:
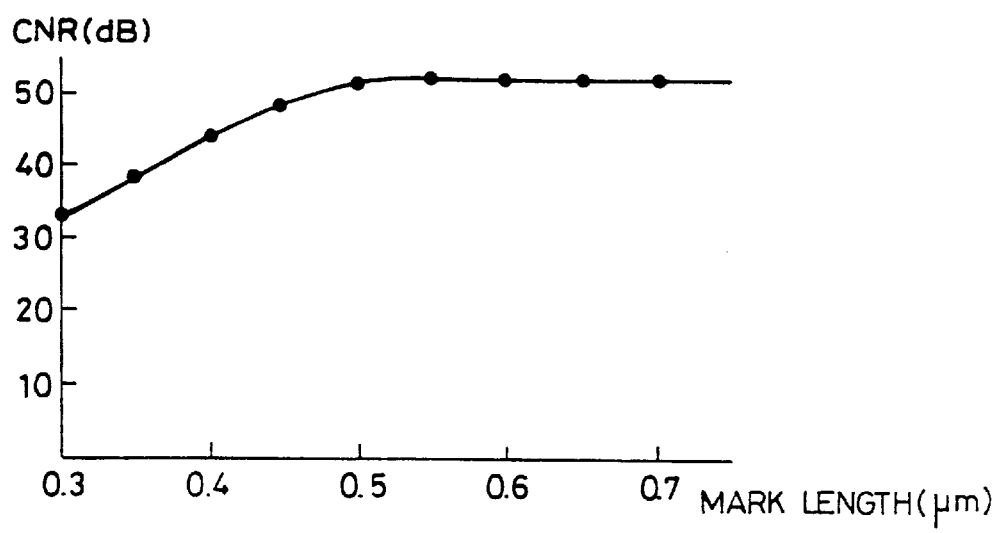
FIG. 9 is a graph illustrating the recording and reproduction characteristics of the magneto-optical recording medium in FIG. 8.

The magneto-optical recording medium was investigated for the dependency of CNR on mark length as done in the first embodiment. FIG. 9 shows the results of such investigation. Likewise in the first embodiment, high CNRs were obtained even in a zone where the mark length is short. More specifically, when recorded bits each having a mark length of 0.3 μm were formed with a mark pitch of 0.6 μm and then reproduced with a reproducing power of 2 mW, a CNR of 33 dB was obtained. This means that the second embodiment provides good reproduction characteristics equivalent to those of the first embodiment.

In the magneto-optical recording medium having the arrangement above-mentioned, the intermediate layer 9 forcibly controls the magnetic coupling between the reproducing layer 3 and the recording layer 4. Accordingly, even though the interface between the reproducing layer 3 and the recording layer 4 undergoes a change in state, such a change hardly exerts an influence upon the transfer of a magnetic domain from the recording layer 4 to the reproducing layer 3.

In this connection, even though a rotary-type sputtering apparatus is used instead of a transit-type sputtering apparatus, the transfer of a magnetic domain of the recording layer 4 to the reproducing layer 3 can be weakened or controlled as necessary. Thus, the magnetic domain of only a necessary small portion of the recording layer 4 can be transferred to the reproducing layer 3. Accordingly, information can be recorded with such high density as required for increasing the recording capacity. Thus, there can sufficiently be recorded image information or the like for which a large-capacity recording and reproducing apparatus is required.

The following description will discuss the recording and reproduction characteristics of the magneto-optical recording medium having the arrangement above-mentioned.

Table 1 shows the results of measurement of the CNRs of the recorded bits each having a mark length of 0.3 μm and a mark pitch of 0.6 μm in magneto-optical recording media of the second embodiment in which the reproducing layers 3 have the same composition, the intermediate layers 9 have the same composition and the recording layers 4 have the same composition, and in which the reproducing layers 3, the intermediate layers 9 and the recording layers 4 have different thicknesses. These measurements were conducted with an optical system using laser having a wavelength of 830 nm. The fact that, as shown in Table 1, some CNRs were obtained for the bits ordinarily recorded with a mark length of 0.3 μm and with a mark pitch of 0.6 μm, means that the magnetic super resolution phenomenon was realized. In Table 1, a mark o is put in the column of reproduction characteristics for each of the media presenting the distinguishing reproduction characteristics of the present invention, i.e., a sudden rise in CNR with an increase in reproducing power, similar to the dependency of CNR on reproducing power shown in FIG. 5 in connection with the first embodiment.

It is understood from Table 1 that the thickness of the reproducing layer 3 is required to be not less than 10 nm. If the thickness of the reproducing layer 3 is less than 10 nm, the amount of light reflected by the reproducing layer 3 is lowered such that information is reproduced mainly by light which has passed through the reproducing layer 3 and which has been reflected from the recording layer 4. This makes it difficult to realize the super resolution phenomenon according to the present invention. On the other hand, the upper limit of the thickness of the reproducing layer 3 does not exist. However, if the reproducing layer 3 is too thick, a great light power is required for raising the temperature of the medium. Thus, the thickness of the reproducing layer 3 is preferably not more than 100 nm.

It is also understood that the thickness of the intermediate layer 9 is not less than 4 nm and not more than 40 nm. If the intermediate layer 9 is reduced in thickness down to about 2 nm, the magnetic coupling between the reproducing layer 3 and the recording layer 4 cannot be controlled. This causes the reproducing layer 3 and the recording layer 4 to be always securely coupled with each other. This fails to realize the super resolution phenomenon according to the present invention. On the other hand, when the intermediate layer 9 is increased in thickness up to 50 nm, the magnetic coupling between the reproducing layer 3 and the recording layer 4 becomes very small. Accordingly, even though the temperature is raised, information of the recording layer 4 cannot be transferred to the reproducing layer 3, failing to realize the super resolution phenomenon according to the present invention.

Further, it is understood that the thickness of the recording layer 4 is required to be not less than 10 nm. If the recording layer 4 is reduced in thickness down to about 5 nm, this lowers the force of magnetic coupling to be exerted to the reproducing layer 3 by the recording layer 4. Accordingly, even though the temperature is raised, information of the recording layer 4 cannot be transferred to the reproducing layer 3, failing to realize the super resolution phenomenon according to the present invention. On the other hand, the upper limit of the thickness of the recording layer 4 does not exist. However, if the recording layer 4 is too thick, a great light power is required for raising the temperature of the medium. Thus, the thickness of the layer 4 is preferably not more than 100 nm.

TABLE 1

| Thickness of Reproducing Layer (nm) | Thickness of Intermediate Layer (nm) | Thickness of Recording Layer (nm) | CNR (dB) | Reproduction Characteristics |
|---|---|---|---|---|
| 5 | 10 | 40 | 0 | — |
| 10 | 10 | 40 | 5 | o |
| 20 | 10 | 40 | 12 | o |
| 30 | 10 | 40 | 33 | o |
| 40 | 10 | 40 | 33 | o |
| 50 | 10 | 40 | 33 | o |
| 60 | 10 | 40 | 33 | o |
| 80 | 10 | 40 | 33 | o |
| 100 | 10 | 40 | 33 | o |
| 40 | 2 | 40 | 0 | — |
| 40 | 4 | 40 | 6 | o |
| 40 | 6 | 40 | 12 | o |
| 40 | 8 | 40 | 22 | o |
| 40 | 10 | 40 | 33 | o |
| 40 | 20 | 40 | 21 | o |
| 40 | 30 | 40 | 10 | o |
| 40 | 40 | 40 | 6 | o |
| 40 | 50 | 40 | 0 | — |
| 40 | 10 | 5 | 0 | — |
| 40 | 10 | 10 | 12 | o |
| 40 | 10 | 20 | 26 | o |
| 40 | 10 | 40 | 33 | o |
| 40 | 10 | 80 | 33 | o |
| 40 | 10 | 120 | 33 | o |

Table 2 shows the results of measurement of the CNRs of recorded bits each having a mark length of 0.3 μm and a mark pitch of 0.6 μm in magneto-optical recording media of the second embodiment in which the reproducing layers 3 have different compositions and the intermediate layers 9 have different compositions. In Table 2, X, Y, A and B represent the composition ratios in $Gd_x(Fe_YCo_{1-Y})_{1-x}$ of the reproducing layers 3 and $Gd_A(Fe_BCo_{1-B})_{1-A}$ of the intermediate layers 9. These measurements were conducted with an optical system using laser having a wavelength of 830 nm. The fact that some CNRs were obtained for the bits ordinarily recorded with a mark length of 0.3 μm and a mark pitch of 0.6 μm, means that the magnetic super resolution phenomenon according to the present invention was realized. In Table 2, a mark o is put in the column of reproduction characteristics for each of the media presenting the distinguishing reproduction characteristics of the present invention, i.e., a sudden rise in CNR with an increase in reproducing power, similar to the dependency of CNR on reproducing power shown in FIG. 5 in connection with the first embodiment. Also, Table 2 show the magnitudes of the recording magnetic fields required for recording.

It is understood from Table 2 that, for the $Gd_x(Fe_YCo_{1-Y})_{1-x}$ of the reproducing layer 3, the following conditions are required to be satisfied:

$0.13 \leq X \leq 0.33$; and $0.50 \leq Y \leq 1.00$.

More specifically, in a composition deviating from the ranges above-mentioned, the reproducing layer 3 is always brought to an in-plane magnetization state and there cannot be realized, in the reproducing layer 3, a perpendicular magnetization state attended with the super resolution phenomenon according to the present invention. By suitably controlling the composition within the ranges above-mentioned, there can be realized, in the reproducing layer 3, a perpendicular magnetization state attended with the super resolution phenomenon according to the present invention.

It is also understood from Table 2 that, for the $Gd_A(Fe_BCo_{1-B})_{1-A}$ of the intermediate layer 9, the following condition is required to be satisfied:

$0.05 \leq A \leq 0.15$; or $0.31 \leq A \leq 0.85$.

In a composition range of A<0.05 or 0.85<A, the in-plane magnetic anisotropy of the intermediate layer 9 becomes too strong. Accordingly, the magnetic coupling between the recording layer 4 and the reproducing layer 3, cannot be so maintained as to provide the magnetic super resolution phenomenon according to the present invention. Also, in a composition range of 0.15<A<0.31, the perpendicular magnetic anisotropy of the intermediate layer 9 becomes too strong such that the recording layer 4 and the reproducing layer 3 is magnetically perfectly coupled with each other. This fails to realize the super resolution phenomenon according to the present invention.

Preferably, the intermediate layer 9 used for preparing the magneto-optical recording medium of the present invention, has a composition containing a greater concentration of rare earth metal than in the compensation composition, i.e., a composition in which A is not less than 0.31 and not more than 0.85. By using the intermediate layer 9 of which composition is within the range above-mentioned, the perpendicular magnetic anisotropy of the intermediate layer 9 can be weakened when the temperature is low, i.e., when the temperature is lower than the level at which the width of the stable magnetic domain of the reproducing layer 3 is equal to or smaller than the width of the recorded magnetic domain of the recording layer 4, and the perpendicular magnetic anisotropy of the intermediate layer 9 can be intensified when the temperature is high, i.e., when the temperature is at the level at which the width of the stable magnetic domain of the reproducing layer 3 is equal to or smaller than the width of the recorded magnetic domain of the recording layer 4. More specifically, the magnetic coupling between the reproducing layer 3 and the recording layer 4 can be weakened when the temperature is low, and the magnetic coupling between the reproducing layer 3 and the recording layer 4 can be intensified when the temperature is high. Accordingly, a more stabilized super resolution operation can readily be executed in a wider range within the composition range of the reproducing layer 3 above-mentioned.

In the foregoing, the description has been made of the $Fe_{0.6}Co_{0.4}$ system. However, when the composition ratio of Fe to Co is changed to increase the concentration of Co, the available range of A is widened.

TABLE 2

| X | Y | A | B | CNR (dB) | Reproduction Characteristics | Recording Magnetic Field (kA/m) |
|---|---|---|---|---|---|---|
| 0.08 | 0.60 | 0.42 | 0.60 | 0 | — | — |
| 0.13 | 0.60 | 0.42 | 0.60 | 12 | o | 75 |
| 0.18 | 0.60 | 0.42 | 0.60 | 23 | o | 75 |
| 0.22 | 0.60 | 0.42 | 0.60 | 32 | o | 75 |
| 0.33 | 0.60 | 0.42 | 0.60 | 20 | o | 75 |
| 0.37 | 0.60 | 0.42 | 0.60 | 0 | — | — |
| 0.22 | 0.47 | 0.42 | 0.60 | 0 | — | — |
| 0.22 | 0.50 | 0.42 | 0.60 | 22 | o | 75 |
| 0.22 | 0.75 | 0.42 | 0.60 | 32 | o | 75 |
| 0.22 | 1.00 | 0.42 | 0.60 | 28 | o | 75 |
| 0.22 | 0.60 | 0.02 | 0.60 | 0 | — | — |
| 0.22 | 0.60 | 0.05 | 0.60 | 12 | o | 75 |
| 0.22 | 0.60 | 0.15 | 0.60 | 28 | o | 75 |
| 0.22 | 0.60 | 0.18 | 0.60 | 0 | — | — |
| 0.22 | 0.60 | 0.27 | 0.60 | 0 | — | — |
| 0.22 | 0.60 | 0.31 | 0.60 | 18 | o | 75 |
| 0.22 | 0.60 | 0.42 | 0.60 | 32 | o | 75 |
| 0.22 | 0.60 | 0.65 | 0.60 | 27 | o | 75 |
| 0.22 | 0.60 | 0.85 | 0.60 | 12 | o | 75 |
| 0.22 | 0.60 | 0.92 | 0.60 | 0 | — | — |

Further, in the second embodiment, GdFeCo and GdDyFe have been discussed for the intermediate layer 9 in the present invention. According to the spirit of the present invention, however, the material of the intermediate layer 9 is not limited to GdFeCo and GdDyFe. That is, it is enough that the magnetic coupling between the reproducing layer 3 and the recording layer 4 can be controlled by the intermediate layer 9. Accordingly, in the second embodiment, the description has been made of GdFeCo and GdDyFe with which there can readily be formed an in-plane magnetized layer capable of relatively readily controlling the magnetic coupling force. However, other than GdFeCo and GdDyFe, there may be used a rare earth transition metal alloy such as TbFeCo, DyFeCo, GdTbFe, GdDyFeCo, GdTbFeCo or the like.

Further, a trace amount of at least one element out of Cr, V, Nb, Mn, Be and Ni elements, may be added to the intermediate layer 9, likewise the reproducing layer 3 and the recording layer 4. With such an addition, the intermediate layer 9 itself is improved in resistance to environment. More specifically, such an addition restrains the intermediate layer 9 from being deteriorated in characteristics due to oxidation of the material caused by the entry of moisture or oxygen, thereby to provide a magneto-optical recording medium excellent in long-term reliability.

Third Embodiment

The following description will discuss a third embodiment of the present invention. For convenience sake, like parts in the third embodiment will be designated by like reference numerals used in the first and second embodiments, and the detailed description thereof will be omitted here.

The magneto-optical recording medium according to the third embodiment was prepared under conditions similar to those used in the second embodiment, except that the intermediate layer 9 in the third embodiment was formed as an in-plane magnetized layer made of $(Gd_{0.61}Dy_{0.39})_{0.4}Fe_{0.60}$ having a thickness of 10 nm. In the third embodiment, the Curie temperature of the intermediate layer 9 is 180° C. which is lower than the Curie temperature (200° C.) of the recording layer 4. In the magneto-optical recording medium of the third embodiment, when the temperature of the recording layer 4 is raised to the Curie temperature thereof or more and a magnetic field for recording information in the recording layer 4, is applied thereto, the temperature of the intermediate layer 9 exceeds the Curie temperature thereof such that the magnetization thereof disappears. As a result, the intermediate layer 9 does not prevent the magnetic field from transferring the magnetization to the recording layer 4. Accordingly, the intensity of the magnetic field required for recording can be lowered. Therefore, without the cost increased, information can be recorded with such high density as required for increasing the recording capacity. Thus, there can sufficiently be recorded image information or the like for which a large-capacity recording and reproducing apparatus is required.

Figure 10:
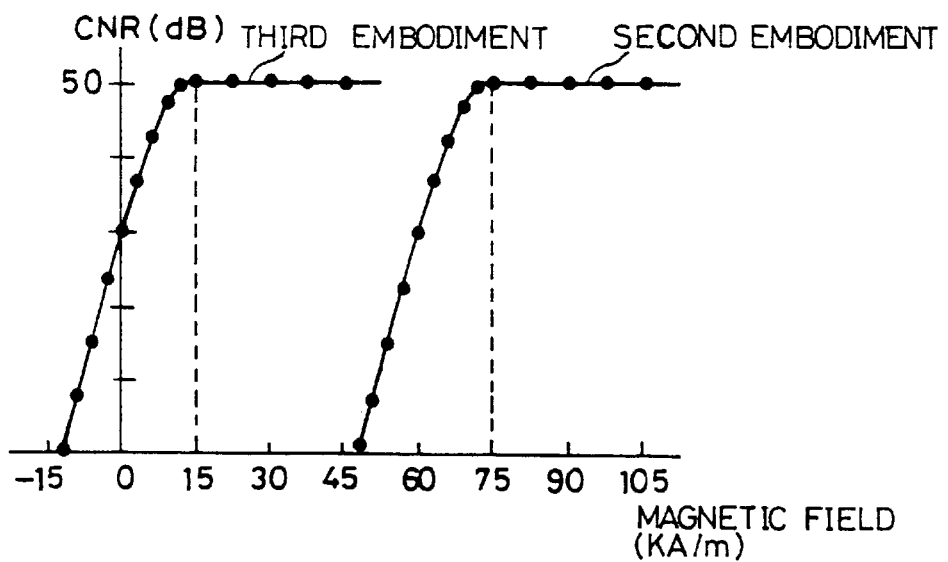
FIG. 10 is a graph illustrating the recording and reproduction characteristics of a magneto-optical recording medium according to a further embodiment of the present invention.

FIG. 10 shows the dependency of CNR on recording magnetic field in the recorded bits each having a mark length of 0.3 μm and a mark pitch of 0.6 μm, in each of the magneto-optical recording media of the second and third embodiments. It is apparent from FIG. 10 that a magnetic field having intensity of 75 kA/m is required for recording information in the second embodiment, but information can be recorded with a magnetic field of 15 kA/m in the third embodiment. Further, the characteristics of the reproducing layer 3 in the third embodiment are the same as the second embodiment. Accordingly, there can be obtained, as the reproduction characteristics, super resolution reproduction characteristics similar to those obtained in the second embodiment. When recorded bits having a mark length of 0.3 μm and a mark pitch of 0.6 μm, were formed and then reproduced with reproducing power of 2 mW, a good CNR of 32 dB was obtained.

The following description will discuss the recording and reproduction characteristics of the magneto-optical recording medium having the arrangement above-mentioned.

Table 3 shows the results of measurement of the CNRs of the recorded bits each having a mark length of 0.3 μm and a mark pitch of 0.6 μm in magneto-optical recording media of the third embodiment in which the reproducing layers 3 have the same composition, the intermediate layers 9 have the same composition and the recording layers 4 have the same composition, and in which the reproducing layers 3, the intermediate layers 9 and the recording layers 4 have different thicknesses. These measurements were conducted with an optical system using laser having a wavelength of 830 nm. The fact that, as shown in Table 3, some CNRs were obtained for the bits ordinarily recorded with a mark length of 0.3 μm and a mark pitch of 0.6 μm, means that the magnetic super resolution phenomenon was realized. In Table 3, a mark o is put in the column of reproduction characteristics for each of the media presenting the distinguishing reproduction characteristics of the present invention, i.e., a sudden rise in CNR with an increase in reproducing power, similar to the dependency of CNR on reproducing power shown in FIG. 5 in connection with the first embodiment.

It is understood from Table 3 that the thickness of the reproducing layer 3 is required to be not less than 10 nm. If the thickness of the reproducing layer 3 is less than 10 nm, light reflected by the reproducing layer 3 is lowered in amount such that information is reproduced mainly by light which has passed through the reproducing layer 3 and which has been reflected from the recording layer 4. This makes it difficult to realize the super resolution phenomenon according to the present invention. On the other hand, the upper limit of the thickness of the reproducing layer 3 does not exist. However, if the reproducing layer 3 is too thick, a great light power is required for increasing the temperature of the medium. Thus, the thickness of the reproducing layer 3 is preferably not more than 100 nm.

It is also understood that the thickness of the intermediate layer 9 is not less than 4 nm and not more than 40 nm. If the intermediate layer 9 is reduced in thickness down to about 2 nm, the magnetic coupling between the reproducing layer 3 and the recording layer 4 cannot be controlled. This causes the reproducing layer 3 and the recording layer 4 to be always securely coupled with each other, failing to realize the super resolution phenomenon according to the present invention. On the other hand, if the intermediate layer 9 is increased in thickness up to 50 nm, the magnetic coupling between the reproducing layer 3 and the recording layer 4 becomes very small. Accordingly, even though the temperature is raised, information of the recording layer 4 cannot be transferred to the reproducing layer 3, failing to realize the super resolution phenomenon according to the present invention.

Further, it is understood that the thickness of the recording layer 4 is required to be not less than 10 nm. If the recording layer 4 is reduced in thickness down to about 5 nm, this lowers the force of magnetic coupling to be exerted to the reproducing layer 3 by the recording layer 4. Accordingly, even though the temperature is raised, information of the recording layer 4 cannot be transferred to the reproducing layer 3, failing to realize the super resolution phenomenon according to the present invention. On the other hand, the upper limit of the thickness of the recording layer 4 does not exist. However, if the recording layer 4 is too thick, a great light power is required for raising the temperature of the medium. Thus, the thickness of the recording layer 4 is preferably not more than 100 nm.

TABLE 3

| Thickness of Reproducing Layer (nm) | Thickness of Intermediate Layer (nm) | Thickness of Recording Layer (nm) | CNR (dB) | Reproduction Characteristics |
|---|---|---|---|---|
| 5 | 10 | 40 | 0 | — |
| 10 | 10 | 40 | 4 | ○ |
| 20 | 10 | 40 | 10 | ○ |
| 40 | 10 | 40 | 32 | ○ |
| 60 | 10 | 40 | 32 | ○ |
| 80 | 10 | 40 | 32 | ○ |
| 100 | 10 | 40 | 32 | ○ |
| 40 | 2 | 40 | 0 | — |
| 40 | 4 | 40 | 8 | ○ |
| 40 | 6 | 40 | 12 | ○ |
| 40 | 8 | 40 | 21 | ○ |
| 40 | 10 | 40 | 32 | ○ |
| 40 | 20 | 40 | 20 | ○ |
| 40 | 30 | 40 | 11 | ○ |
| 40 | 40 | 40 | 5 | ○ |
| 40 | 50 | 40 | 0 | — |
| 40 | 10 | 5 | 0 | — |
| 40 | 10 | 10 | 10 | ○ |
| 40 | 10 | 20 | 28 | ○ |
| 40 | 10 | 40 | 32 | ○ |
| 40 | 10 | 80 | 32 | ○ |
| 40 | 10 | 120 | 32 | ○ |

Table 4 shows the results of measurement of the CNRs of the recorded bits having a mark length of 0.3 μm and a mark pitch of 0.6 μm in magneto-optical recording media of the third embodiment in which the reproducing layers 3 have different compositions and the intermediate layers 9 have different compositions. In Table 4, X, Y, A and B represent the composition ratios in $Gd_x(Fe_YCo_{1-Y})_{1-x}$ of the reproducing layers 3 and $(Gd_ADy_{1-A})_BFe_{1-B}$ of the intermediate layers 9. These measurements were conducted with an optical system using laser having a wavelength of 830 nm. The fact that some CNRs were obtained for the bits ordinarily recorded with a mark length of 0.3 μm and a mark pitch of 0.6 μm, means that the magnetic super resolution phenomenon according to the present invention was realized. In Table 4, a mark o is put in the column of reproduction characteristics for each of the media presenting the distinguishing reproduction characteristics of the present invention, i.e., a sudden rise in CNR with an increase in reproducing power, similar to the dependency of CNR on reproducing power shown in FIG. 5 in connection with the first embodiment. Also, Table 4 shows the magnitudes of the recording magnetic fields required for recording.

It is understood from Table 4 that, for the $Gd_x(Fe_YCo_{1-Y})_{1-x}$ of the reproducing layer 3, the following conditions are required to be satisfied:

$0.13 \leq X \leq 0.33$; and $0.50 \leq Y \leq 1.00$

More specifically, in a composition deviating from the ranges above-mentioned, the reproducing layer 3 is always brought to an in-plane magnetization state and there cannot be realized, in the reproducing layer 3, a perpendicular magnetization state attended with the super resolution phenomenon according to the present invention. By suitably controlling the composition within the ranges above-mentioned, there can be realized, in the reproducing layer 3, a perpendicular magnetization state attended with the super resolution phenomenon according to the present invention.

It is also understood from Table 4 that, for the $(Gd_ADy_{1-A})_BFe_{1-B}$ of the intermediate layer 9, the following conditions are required to be satisfied:

$0.30 \leq A \leq 1.00$; and $0.05 \leq B \leq 0.15$ or $0.35 \leq B \leq 0.85$

In the composition range of A<0.30, the Curie temperature of the intermediate layer 9 becomes too low. Accordingly, by the irradiation of reproducing light, the temperature of the intermediate layer 9 is raised to the Curie temperature or more, thus preventing information from being transferred.

Also, in the composition range of B<0.05 or 0.85<B, the in-plane magnetic anisotropy of the intermediate layer 9 becomes too strong. Accordingly, the magnetic coupling between the recording layer 4 and the reproducing layer 3, cannot be so maintained as to provide the magnetic super resolution phenomenon according to the present invention. Also, in a composition range of 0.15<B<0.35, the perpendicular magnetic anisotropy of the intermediate layer 9 becomes too strong such that the recording layer 4 and the reproducing layer 3 is magnetically perfectly coupled with each other. This fails to realize the super resolution phenomenon according to the present invention.

By using the composition in the ranges above-mentioned for the intermediate layer 9 used for preparing the magneto-optical recording medium of the present invention, the perpendicular magnetic anisotropy of the intermediate layer 9 can be weakened when the temperature is low, i.e., when the temperature is at the level at which the width of the stable magnetic domain of the reproducing layer 3 is equal to or greater than the width of the recorded magnetic domain of the recording layer 4, and the perpendicular magnetic anisotropy of the intermediate layer 9 can be intensified when the temperature is high, i.e., when the temperature is at the level at which the width of the stable magnetic domain of the reproducing layer 3 is equal to or smaller than the width of the recorded magnetic domain of the recording layer 4. More specifically, the magnetic coupling between the reproducing layer 3 and the recording layer 4 can be weakened when the temperature is low, and the magnetic coupling between the reproducing layer 3 and the recording layer 4 can be intensified when the temperature is high. Accordingly, a more stabilized super resolution operation can readily be executed in a wider range within the composition range of the reproducing layer 3 above-mentioned.

To record information in a weak magnetic field, A is required to be in the range of $0.30 \leq A \leq 0.68$. If A is in the range of $0.68 < A \leq 0.85$, the concentration of Dy is reduced such that the Curie temperature of the intermediate layer 9 is raised and becomes higher than the Curie temperature of the recording layer 4.

TABLE 4

| X | Y | A | B | CNR (dB) | Reproduction Characteristics | Recording Magnetic Field (kA/m) |
|---|---|---|---|---|---|---|
| 0.08 | 0.60 | 0.61 | 0.40 | 0 | — | — |
| 0.13 | 0.60 | 0.61 | 0.40 | 12 | ○ | 15 |
| 0.17 | 0.60 | 0.61 | 0.40 | 23 | ○ | 15 |
| 0.22 | 0.60 | 0.61 | 0.40 | 32 | ○ | 15 |
| 0.26 | 0.60 | 0.61 | 0.40 | 30 | ○ | 15 |
| 0.33 | 0.60 | 0.61 | 0.40 | 18 | ○ | 15 |
| 0.37 | 0.60 | 0.61 | 0.40 | 0 | — | — |
| 0.22 | 0.47 | 0.61 | 0.40 | 0 | — | — |
| 0.22 | 0.50 | 0.61 | 0.40 | 22 | ○ | 15 |
| 0.22 | 0.75 | 0.61 | 0.40 | 32 | ○ | 15 |
| 0.22 | 1.00 | 0.61 | 0.40 | 28 | ○ | 15 |
| 0.22 | 0.60 | 0.61 | 0.03 | 0 | — | — |
| 0.22 | 0.60 | 0.61 | 0.05 | 18 | ○ | 15 |
| 0.22 | 0.60 | 0.61 | 0.15 | 27 | ○ | 15 |
| 0.22 | 0.60 | 0.61 | 0.18 | 0 | — | — |
| 0.22 | 0.60 | 0.61 | 0.31 | 0 | — | — |
| 0.22 | 0.60 | 0.61 | 0.35 | 13 | ○ | 15 |
| 0.22 | 0.60 | 0.61 | 0.54 | 31 | ○ | 15 |
| 0.22 | 0.60 | 0.61 | 0.85 | 12 | ○ | 15 |
| 0.22 | 0.60 | 0.61 | 0.90 | 0 | — | — |

Fourth Embodiment

The following description will discuss a fourth embodiment of the present invention. For convenience sake, like parts in the fourth embodiment will be designated by like reference numerals used in the first to third embodiments, and the detailed description thereof will be omitted here.

Figure 11A:
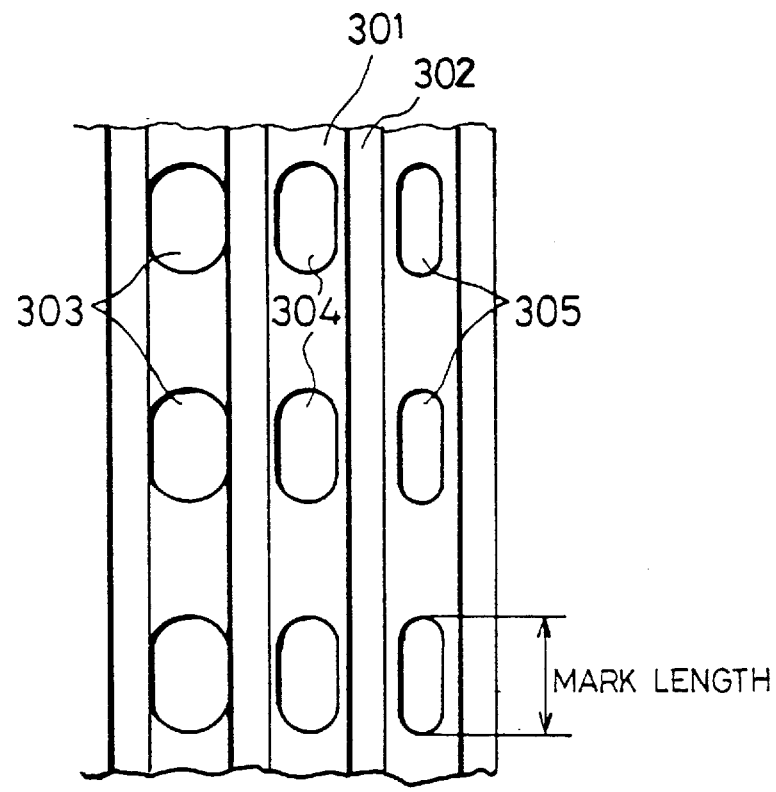
FIG. 11(a) is a plan view illustrating a method of recording and reproducing information in and from a magneto-optical recording medium according to still another embodiment of the present invention.
Figure 11B:
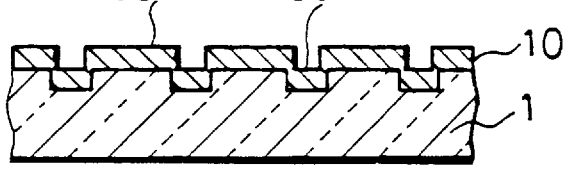
FIG. 11(b) is a section view of FIG. 11(a)

In FIGS. 11(a) and (b), a magneto-optical recording medium according to the fourth embodiment comprises a medium layer 10 and a substrate 1 on which the medium layer 10 is formed. The medium layer 10 has the layer arrangement of the third embodiment including the transparent dielectric layer 2 of AlN having a thickness of 50 nm, the reproducing layer 3 made of $Gd_{0.22}(Fe_{0.60}Co_{0.40})_{0.78}$ having a thickness of 50 nm, the intermediate layer 9 made of $(Gd_{0.61}Dy_{0.39})_{0.40}Fe_{0.60}$ having a thickness of 10 nm, the recording layer 4 made of $Dy_{0.23}(Fe_{0.78}Co_{0.22})_{0.77}$ having a thickness of 50 nm, the protective layer 5 made of AlN having a thickness of 50 nm and the overcoat layer 6. The substrate 1 has a land specification made of polycarbonate including (i) lands 301 each having a width of 0.9 μm and a pitch of 1.2 μm and (ii) grooves 302 each having a width of 0.3 μm. The lands 301 serve as recording tracks. That is, recorded bits 303, 304, 305 respectively having different widths are formed in those portions of the recording layer 4 corresponding to the lands 301.

Figure 12:
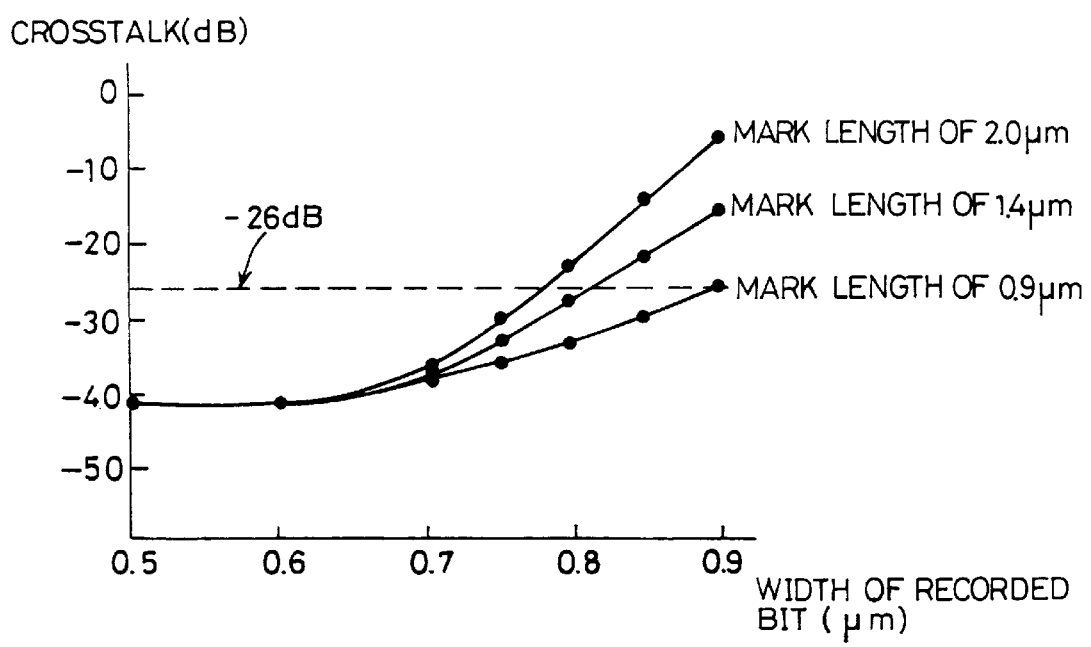
FIG. 12 is a graph illustrating the recording and reproduction characteristics of the magneto-optical recording medium in FIGS. 11(a) and (b)

FIG. 12 shows the results of measurements which show how crosstalk undergoes a change for each of different mark lengths when the width of a recorded bit changes as shown in FIG. 11(a). As to the crosstalk, the ISO 10089 Standards (which stipulate the standards for rewritable optical disks of 5.25 inches) stipulate that the crosstalk amount is not more than −26 dB for the shortest recorded bit (0.765 μm). For a longer recorded bit, the crosstalk amount is increased but preferably not more than −26 dB. In the fourth embodiment, the crosstalk amount was measured for each recorded bit according to the crosstalk measuring method set forth in the ISO 10089 Standards.

As shown in FIG. 12, it is understood that, for each of the recorded bits having a width of not more than 0.7 μm, the crosstalk amount was about −40 dB for any of the mark lengths such that substantially no crosstalk was produced. However, when the width of a recorded bit exceeds 0.7 μm, the crosstalk amount is suddenly increased. This trend is remarkable when the mark length is longer. More specifically, to reduce the crosstalk amount in the fourth embodiment, the width of a recorded bit is required to be narrower than the land width.

Figure 13:
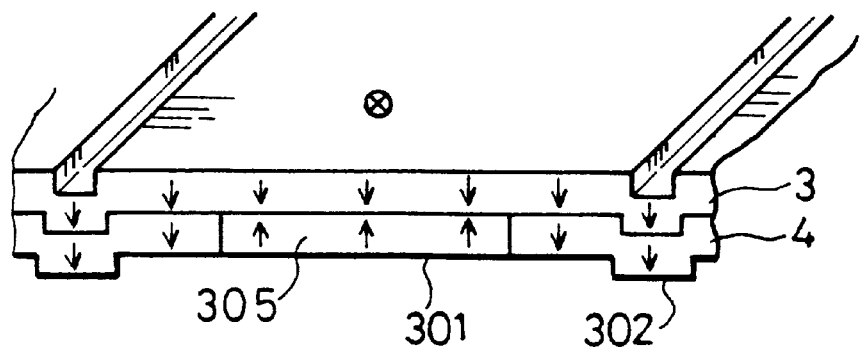
FIG. 13 is a view illustrating a method of recording and reproducing information in and from the magneto-optical recording medium in FIGS. 11(a) and (b)
Figure 14:
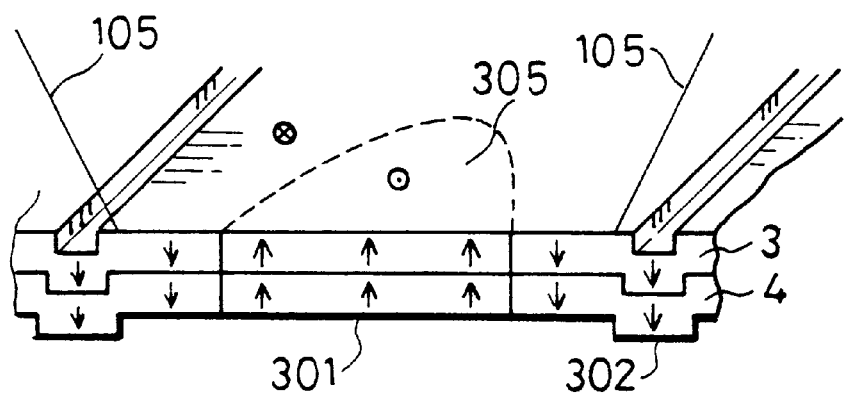
FIG. 14 is a view illustrating a method of recording and reproducing information in and from the magneto-optical recording medium in FIGS. 11(a) and (b)
Figure 15:
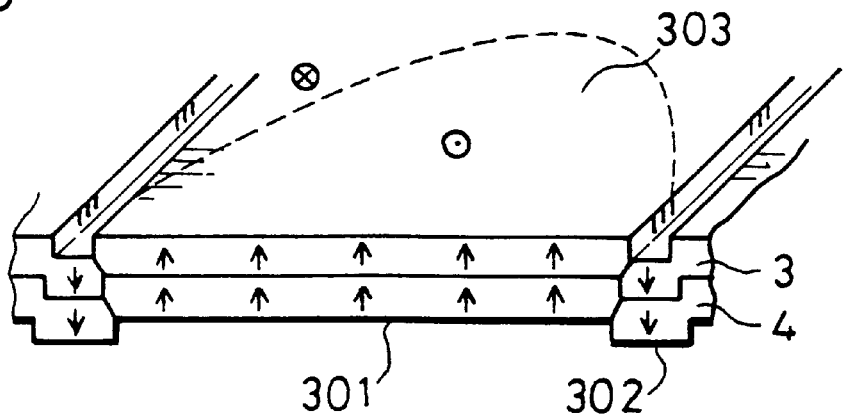
FIG. 15 is a view illustrating a method of recording and reproducing information in and from the magneto-optical recording medium in FIGS. 11(a) and (b)

In FIGS. 13 to 15 illustrating the foregoing phenomena, there are shown, for simplification, only the reproducing layer 3 and the recording layer 4 of the magneto-optical recording medium. In each of FIGS. 13 and 14, a recorded bit 305 having a width narrower than the land width is formed in the recording layer 4. When a condensed light beam 105 is not irradiated as shown in FIG. 13, the width of the stable magnetic domain of the reproducing layer 3 is wider than the width of the recorded bit. Accordingly, no information is transferred to the reproducing layer 3 and that portion of the reproducing layer 3 on the recorded bit is the same in magnetization direction as the surroundings of the recorded bit.

When the condensed light beam 105 is irradiated as shown in FIG. 14, the width of the stable magnetic domain of the reproducing layer 3 becomes narrower than the width of the recorded bit. Thus, the transfer of information to the reproducing layer 3 takes place.

However, when there is formed a recorded bit 303 having the same width as the land width as shown in FIG. 15, the magnetic layers are discontinued at the boundary between the lands and the grooves such that the width of the stable magnetic domain becomes substantially identical with the land width. Accordingly, in the state where the light beam 105 is not irradiated, i.e., in the state at room temperature, the information of the recording layer 4 is transferred to the reproducing layer 3, thus presenting no super resolution phenomenon according to the present invention. For this reason, the width of a recorded bit is required to be so regulated as to be narrower than the land width. For example, the reproducing power of the light beam 105 is required to be set to a value with which the width of a recorded bit becomes narrower than the land width.

According to the recording and reproducing method above-mentioned, it is possible to transfer and reproduce, to and from the reproducing layer 3, only the information of magnetic domain of that portion of the recording layer 4 corresponding to the center portion of the light beam in which temperature rise has exceeded a predetermined value by the irradiation of a light beam. Accordingly, information can be recorded with such high density as required for increasing the recording capacity. Thus, there can sufficiently be recorded image information or the like for which a large-capacity recording and reproducing apparatus is required.

Fifth Embodiment

The following description will discuss a fifth embodiment of the present invention. For convenience sake, like parts in the fifth embodiment will be designated by like reference numerals used in the first to fourth embodiments, and the detailed description thereof will be omitted here.

Figure 16A:
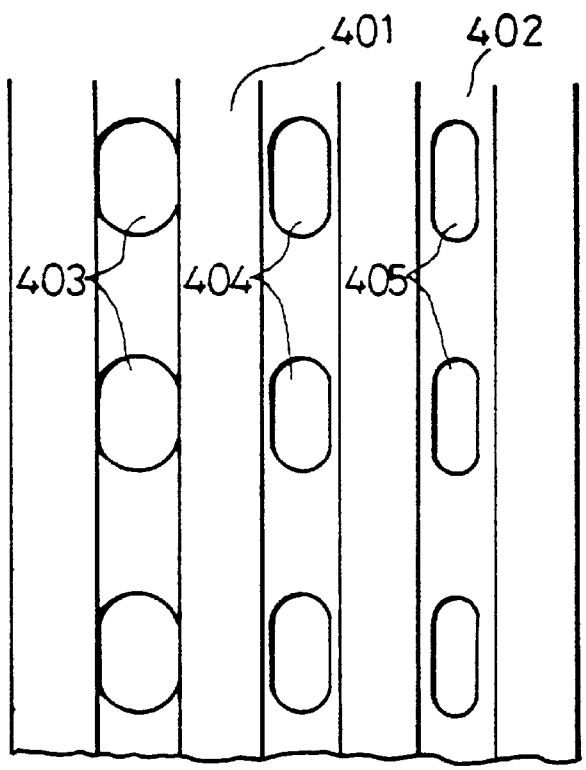
FIG. 16(a) is a plan view illustrating a method of recording and reproducing information in and from a magneto-optical recording medium according to a still further embodiment of the present invention.
Figure 16B:
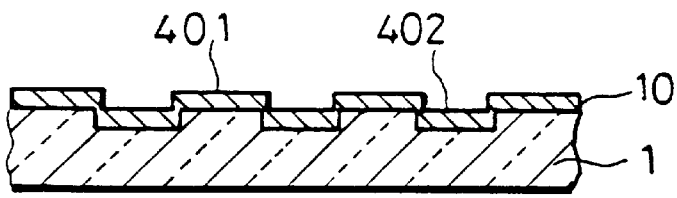
FIG. 16(b) is a section view of FIG. 16(a)

In FIGS. 16(a) and (b), a magneto-optical recording medium according to the fifth embodiment comprises a medium layer 10 and a substrate 1 on which the medium layer 10 is formed. The medium layer 10 has the layer arrangement of the third embodiment including the transparent dielectric layer 2 of AlN having a thickness of 50 nm, the reproducing layer 3 made of $Gd_{0.22}(Fe_{0.60}Co_{0.40})_{0.78}$ having a thickness of 50 nm, the intermediate layer 9 made of $(Gd_{0.61}Dy_{0.39})_{0.40}Fe_{0.60}$ having a thickness of 10 nm, the recording layer 4 made of $Dy_{0.23}(Fe_{0.78}Co_{0.22})_{0.77}$ having a thickness of 50 nm, the protective layer 5 made of AlN having a thickness of 50 nm and the overcoat layer 6. The substrate 1 has a land specification made of polycarbonate including (i) lands 401 having a width of 0.7 µm and a pitch of 1.4 µm and (ii) grooves 402 having a width of 0.7 µm. The lands 401 serve as recording tracks. That is, recorded bits 403, 404, 405 respectively having different widths are formed in those portions of the recording layer 4 corresponding to the grooves 402.

Figure 17:
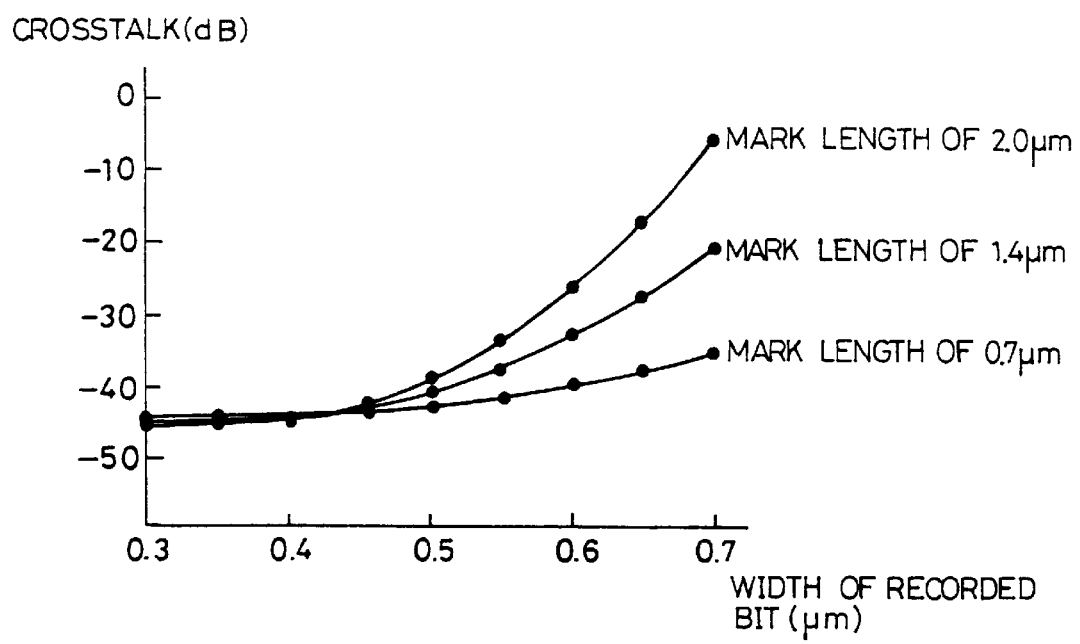
FIG. 17 is a graph illustrating the recording and reproduction characteristics of the magneto-optical recording medium in FIGS. 16(a) and (b)

FIG. 17 shows the results of measurements which show how crosstalk undergoes a change for each of different mark lengths when the width of a recorded bit changes as shown in FIG. 16(a). In the fifth embodiment, the crosstalk amount was measured for each recorded bit according to the crosstalk measuring method set forth in the ISO 10089 Standards, as done in the fourth embodiment.

As shown in FIG. 17, it is understood that, for each of the recorded bits each having a width of not more than 0.5 µm, the crosstalk amount was about −40 dB for any of the mark lengths such that substantially no crosstalk was produced. However, when the width of a recorded bit exceeds 0.5 m, the crosstalk amount is suddenly increased. This trend is remarkable when the mark length is longer. More specifically, to reduce the crosstalk amount in the fifth embodiment, the width of a recorded bit is required to be narrower than the groove width.

As to the land portions, too, it is apparent that the width of a recorded bit is required to be narrower than the land width likewise in the fourth embodiment.

Figure 18A:
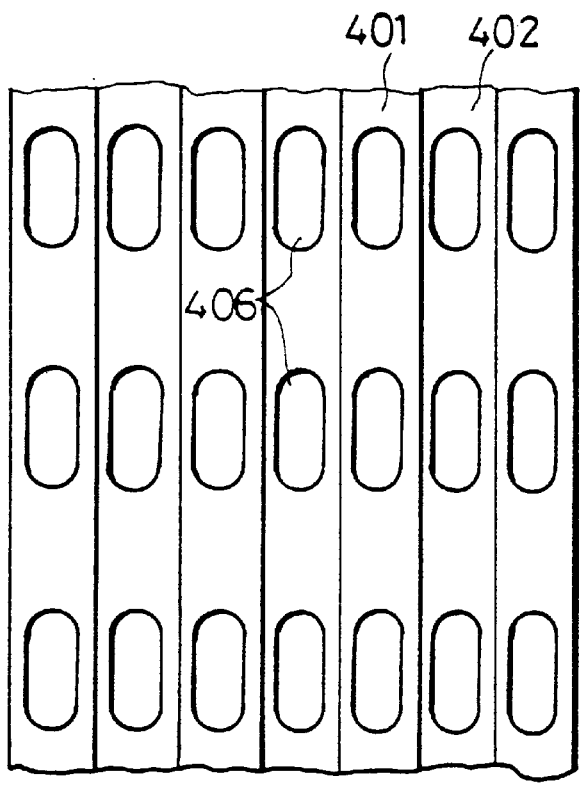
FIG. 18(a) is a plan view illustrating a method of recording and reproducing information in and from the magneto-optical recording medium in FIGS. 16(a) and (b)
Figure 18B:
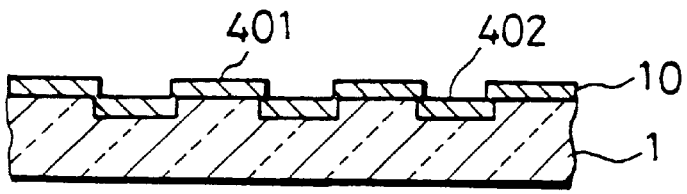
FIG. 18(b) is a section view of FIG. 18(a)

FIGS. 18(a) and (b) illustrate the case in which both the lands 401 and the grooves 402 serve as the recording tracks and information has been recorded in both the lands 401 and the grooves 402. In such an arrangement, it is required to minimize the crosstalk from adjacent grooves or from adjacent lands, and the crosstalk amount is preferably not more than −26 dB.

Figure 19:
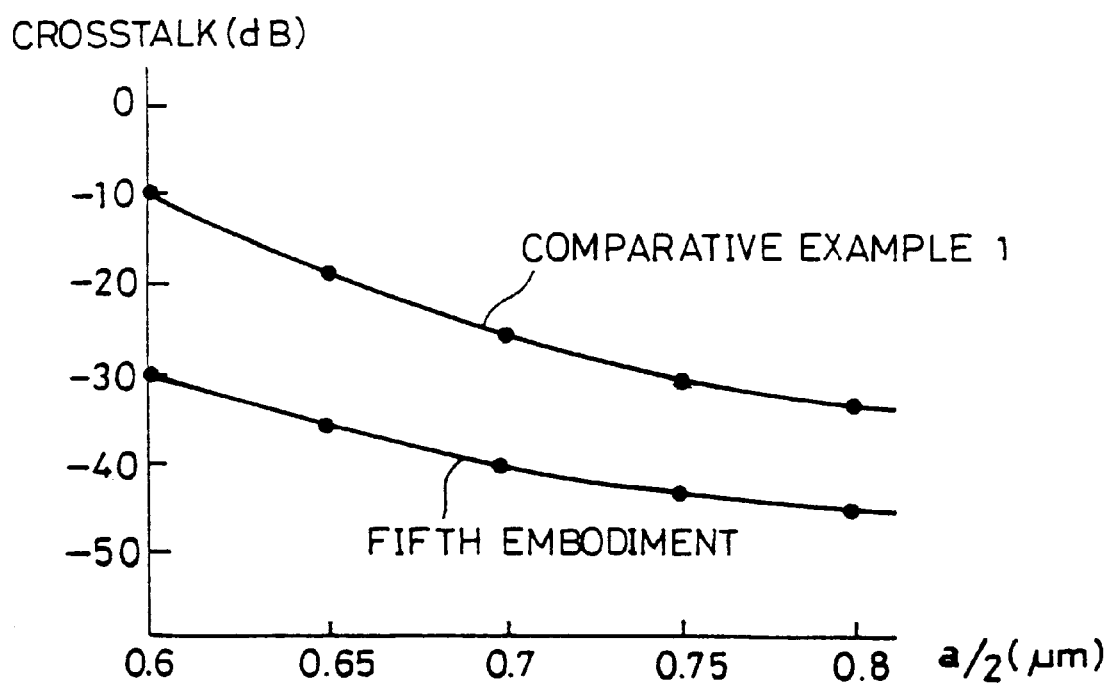
FIG. 19 is a graph illustrating the recording and reproduction characteristics of the magneto-optical recording medium shown in FIGS. 16(a) and (b)

FIG. 19 shows the results of evaluation on the crosstalks generated from adjacent grooves of both the magneto-optical recording medium of the fifth embodiment shown in FIGS. 18(a) and (b) and the magneto-optical recording medium disclosed in Japanese Patent Laid-Open Publication No. 5-81717, i.e., Comparative Example 1 discussed in connection with the first embodiment. In such an arrangement, information is recorded in both the lands 401 and the grooves 402. Accordingly, the crosstalk was evaluated by measuring crosstalks generated from adjacent grooves for each land 401 serving as the measuring subject.

Information was recorded in the form of recorded bits 406 each of which width was narrower by 0.1 µm than each land or groove width (a/2). In Comparative Example 1, crosstalk greater than −26 dB was generated already for the land or groove width a/2 equal to 0.7 µm. In the fifth embodiment, however, even though the land or groove width a/2 became as narrow as 0.6 µm, only small crosstalk not more than −26 dB was generated. Thus, according to the fifth embodiment, information can be recorded with higher density as compared with Comparative Example 1.

The specific modes and embodiments discussed in the Detailed Description of the Invention are to be considered in all respects as illustrative for clarifying the technical contents of the present invention. Therefore, the present invention is not to be construed in a restricted sense as limited to these specific embodiments. Therefore, the present invention may be embodied as modified in a variety of manners within the spirit thereof and the scope of the appended claims.

What is claimed is:

1. A magneto-optical recording medium having a transparent substrate upon which magnetic layers are formed over a top surface of said substrate, said medium having data tracks extending in a first direction in a plane parallel to said top surface of said substrate, said data tracks having a track width in a second direction in said plane, said second direction being perpendicular to said first direction at a point where said first and second directions meet, said medium comprising:

a recording layer, having a thickness greater than 10 nm and less than 100 nm, in which information is to be recorded;

a reproducing layer, having a thickness greater than 10 nm and less than 100 nm, to and from which information recorded in said recording layer is to be transferred and read out, said reproducing layer comprising a specific material such that, at room temperature, the stable magnetic domain width in said second direction is wider than the width in said second direction of the recorded magnetic domain formed in said recording layer and that, as the temperature of the reproducing layer increases, said stable magnetic domain width of said reproducing layer is not greater than said width of said recorded magnetic domain of said recording layer;

wherein said reproducing layer has a perpendicular magnetic anisotropy; at room temperature wherein said reproducing layer and said recording layer have a composition gradient at an interface therebetween so as to change the intensity of magnetic coupling between said reproducing layer and said recording layer as the temperature changes; and wherein said composition gradient at the interface between said reproducing layer and said recording layer is formed by means of a transit sputtering process.

2. A magneto-optical recording medium having a transparent substrate upon which magnetic layers are formed over a top surface of said substrate, said medium having data tracks extending in a first direction in a plane parallel to said top surface of said substrate, said data tracks having a track width in a second direction in said plane, said second direction being perpendicular to said first direction at a point where said first and second directions meet, said medium comprising:

a recording layer, having a thickness greater than 10 nm and less than 100 nm, in which information is to be recorded;

a reproducing layer, having a thickness greater than 10 nm and less than 100 nm, to and from which information recorded in said recording layer is to be transferred and read out, said reproducing layer comprising a specific material such that, at room temperature, the stable magnetic domain width in said second direction is wider than the width in said second direction of the recorded magnetic domain formed in said recording layer, and that when the temperature of said reproducing layer is in a range of values higher than room temperature, said stable magnetic domain width of said reproducing layer becomes not greater than said width of said recorded magnetic domain of said recording layer;

wherein said reproducing layer has a perpendicular magnetic anisotropy at room temperature; and an intermediate layer, being interposed between said reproducing layer and said recording layer, wherein, at a temperature lower than said range of values, said intermediate layer weakens the intensity of magnetic coupling between said reproducing layer and said recording layer as compared to said magneto-optical recording media in the absence of said intermediate layer, and, at a temperature within said range of values, said intermediate layer intensifies the intensity of magnetic coupling between said reproducing layer and said recording layer as compared to said magneto-optical recording media in the absence of said intermediate layer.

3. A magneto-optical recording medium according to claim 2, wherein said reproducing layer has a transition metal rich composition in which the atomic ratio of transition metal to rare earth metal is greater than the atomic ratio of transition metal to rare earth metal in the compensation composition.

4. A magneto-optical recording medium according to claim 2, wherein said intermediate layer has a perpendicular magnetic anisotropy at a temperature in said range of values.

5. A magneto-optical recording medium according to claim 2, wherein said recording layer comprises a perpendicularly magnetized layer which has a compensation temperature that is approximately equal to room temperature.

6. A magneto-optical recording medium according to claim 2, further comprising a heat releasing layer for radiating heat, the heat releasing layer being disposed on one side of said recording layer and said reproducing layer being disposed on another side of said recording layer.

7. A magneto-optical recording medium according to claim 2, wherein said intermediate layer has in-plane magnetic anisotropy at temperatures below said range of values.

8. A magneto-optical recording medium according to claim 2, wherein said intermediate layer has in-plane magnetic anisotropy at temperatures lower than said range of values and has a perpendicular magnetic anisotropy at temperatures within said range of values.

9. A magneto-optical recording medium according to claim 2, wherein said intermediate layer has a thickness in the range of 4 nm to 40 nm.

10. A magneto-optical recording medium according to claim 3, wherein said reproducing layer is made of $Gd_{0.22}(Fe_{0.60}Co_{0.40})_{0.78}$.

11. A magneto-optical recording medium according to claim 9, wherein said reproducing layer has a rendition metal rich composition in which the atomic ratio of transition metal to rare earth metal is greater than the atomic ratio of transition metal to rare earth metal in the compensation compsoition.

12. A magneto-optical recording medium according to claim 4, wherein said reproducing layer has a transition metal rich composition in which the atomic ratio of transition metal to rare earth metal is greater than the atomic ratio of transition metal to rare earth metal in the compensation composition.

13. A magneto-optical recording medium according to claim 11, wherein said reproducing layer is made of $Gd_{0.22}(Fe_{0.60}Co_{0.40})_{0.78}$.

14. A magneto-optical recording medium according to claim 12, wherein said reproducing layer is made of $Gd_{0.22}(Fe_{0.60}Co_{0.40})_{0.78}$.

15. A magneto-optical recording medium according to claim 4, wherein said reproducing layer is made of $Gd_X(Fe_YCo_{1-Y})_{1-X}$, X satisfies the condition of $0.13 \leq X \leq 0.33$ and Y satisfies the condition of $0.50 \leq Y \leq 1.00$, and said intermediate layer is made of $Gd_A(Fe_BCo_{1-B})_{1-A}$, A satisfies the condition of $0.31 \leq A \leq 0.85$ and $B=0.60$.

16. A magneto-optical recording medium according to claim 4, wherein the Curie temperature of said intermediate layer is set to temperature lower than the Curie temperature of said recording layer.

17. A magneto-optical recording medium according to claim 16, wherein when it is supposed that said reproducing layer is made of $Gd_X(Fe_YCo_{1-Y})_{1-X}$, X satisfies the condition of $0.13 \leq X \leq 0.33$ and Y satisfies the condition of $0.50 \leq Y \leq 1.00$, and when it is supposed that said intermediate layer is made of $(Gd_ADy_{1-A})_BFe_{1-B}$, A satisfies the condition of $0.30 \leq A \leq 0.68$, and B satisfies the condition of $0.05 \leq B \leq 0.15$ or the condition of $0.35 \leq B \leq 0.85$.

18. A magneto-optical recording medium having magnetic layers formed over a surface of said medium, said medium having data tracks extending in a first direction in a plane parallel to said surface of said medium, said data tracks having a track width in a second direction in said plane, said second direction being perpendicular to said first direction at a point where said first and second directions meet, said medium comprising:

a recording layer in which information is to be recorded;

a reproducing layer to and from which information recorded in said recording layer is to be transferred and read out, said reproducing layer comprising a specific material such that, at room temperature, the stable magnetic domain width in said second direction is wider than the width in said second direction of the recorded magnetic domain formed in said recording layer and that, as the temperature of the reproducing layer increases, said stable magnetic domain width of said reproducing layer is not greater than said width of said recorded magnetic domain of said recording layer;

wherein said reproducing layer has a perpendicular magnetic anisotropy at room temperature;

wherein said reproducing layer and said recording layer have a composition gradient at an interface therebetween so as to change the intensity of magnetic coupling between said reproducing layer and said recording layer as the temperature changes; and wherein said composition gradient at the interface between said reproducing layer and said recording layer is formed by means of a transit sputtering process.

19. A magneto-optical recording medium having magnetic layers formed over a surface of said medium, said medium having data tracks extending in a first direction in a plane parallel to said surface of said medium, said data tracks having a track width in a second direction in said plane, said second direction being perpendicular to said first direction at a point where said first and second directions meet, said medium comprising:

a recording layer in which information is to be recorded;

a reproducing layer to and from which information recorded in said recording layer is to be transferred and read out, said reproducing layer comprising a specific material such that, at room temperature, the stable magnetic domain width in said second direction is wider than the width in said second direction of the recorded magnetic domain formed in said recording layer and that, when the temperature of said reproducing layer is in a range of values higher than room temperature, said stable magnetic domain width of said reproducing layer becomes not greater than said width of said recorded magnetic domain of said recording layer;

wherein said reproducing layer has a perpendicular magnetic anisotropy at room temperature; and an intermediate layer, being interposed between said reproducing layer and said recording layer, wherein, at a temperature lower than said range of values, said intermediate layer weakens the intensity of magnetic coupling between said reproducing layer and said recording layer as compared to said magneto-optical recording media in the absence of said intermediate layer, and, at a temperature within said range of values, said intermediate layer intensifies the intensity of magnetic coupling between said reproducing layer and said recording layer as compared to said magneto-optical recording media in the absence of said intermediate layer.

20. The medium of claim 19, wherein said reproducing layer has perpendicular magnetic anisotropy both at room temperature and in said range of values.

21. A magneto-optical recording medium according to claim 19, wherein said reproducing layer has a composition in which the atomic ratio of transition metal to rare earth metal is greater than the atomic ratio of transition metal to rare earth metal in the compensation composition.

22. A magneto-optical recording medium according to claim 19, wherein said intermediate layer has an in-plane magnetic anisotropy at temperatures below said range of values.

23. A magneto-optical recording medium according to claim 19, wherein said intermediate layer has an in-plane magnetic anisotropy at temperatures lower than said range of values and has a perpendicular magnetic anisotropy at temperatures within said range of values.

24. A magneto-optical recording medium according to claim 19, wherein said intermediate layer has a perpendicular magnetic anisotropy at a temperature in said range of values.

25. A magneto-optical recording medium according to claim 19, wherein said intermediate layer has a thickness in the range of from 4 nm to 40 nm.

26. A magneto-optical recording medium according to claim 24, wherein said reproducing layer has a composition in which the atomic ratio of transition metal to rare earth metal is greater than the atomic ratio of transition metal to rare earth metal in the compensation composition.

27. A magneto-optical recording medium according to claim 25, wherein said reproducing layer has a composition in which the atomic ratio of transition metal to rare earth metal is greater than the atomic ratio of transition metal to rare earth metal in the compensation composition.

28. A magneto-optical recording medium according to claim 25, wherein said intermediate layer has an in-plain magnetic anisotropy at temperatures below said range of values.

29. A magneto-optical recording medium according to claim 24, wherein said reproducing layer is made of $Gd_X(Fe_YCo_{1-Y})_{1-X}$, X satisfies the condition of $0.13 \leq X \leq 0.33$ and Y satisfies the condition of $0.50 \leq Y \leq 1.00$, and said intermediate layer is made of $Gd_A(Fe_BCo_{1-B})_{1-A}$, A satisfies the condition of $0.31 \leq A \leq 0.85$ and $B=0.60$.

30. A magneto-optical recording medium having magnetic layers formed over a surface of said medium, said medium having data tracks extending in a first direction in a plane parallel to said surface of said medium, said data tracks having a track width in a second direction in said plane, said second direction being perpendicular to said first direction at a point where said first and second directions meet, said medium comprising:

a recording layer in which information is to be recorded;

a reproducing layer to and from which information recorded in said recording layer is to be transferred and read out, said reproducing layer comprising a specific material such that, at room temperature, the stable magnetic domain width in said second direction is wider than the width in said second direction of the recorded magnetic domain formed in said recording layer and that, when the temperature of said reproducing layer is in a range of values higher than room temperature, said stable magnetic domain width of said reproducing layer becomes not greater than said width of said recorded magnetic domain of said recording layer;

wherein said reproducing layer has a perpendicular magnetic anisotropy at room temperature;

wherein said reproducing layer and said recording layer have a composition gradient at an interface therebetween so as to change the intensity of magnetic coupling between said reproducing layer and said recording layer as the temperature changes; and wherein said composition gradient at the interface between said reproducing layer and said recording layer is formed by means of a transit sputtering process.

31. A magneto-optical recording medium having a transparent substrate upon which magnetic layers are formed over a top surface of said substrate, said medium having data tracks extending in a first direction in a plane parallel to said top surface of said substrate, said data tracks having a track width in a second direction in said plane, said second direction being perpendicular to said first direction at a point where said first and second directions meet, said medium comprising:

a recording layer, having a thickness greater than 10 nm and less than 100 nm, in which information is to be recorded;

a reproducing layer, having a thickness greater than 10 nm and less than 100 nm, to and from which information recorded in said recording layer is to be transferred and read out, said reproducing layer comprising a specific material such that, at room temperature, the stable magnetic domain width in said second direction is wider than the width in said second direction of the recorded magnetic domain formed in said recording layer, and that when the temperature of said reproducing layer is in a range of values higher than room temperature, said stable magnetic domain width of said reproducing layer becomes not greater than said width of said recorded magnetic domain of said recording layer;

wherein said reproducing layer has a perpendicular magnetic anisotropy at room temperature; and an intermediate layer, being interposed between said reproducing layer and said recording layer, which intensifies the intensity of magnetic coupling between said reproducing layer and said recording layer that are at a temperature within said range of values greater than the intensity of magnetic coupling between said reproducing layer and said recording layer that are at a temperature lower than said range of values.

32. A magneto-optical recording medium having magnetic layers formed over a surface of said medium, said medium having data tracks extending in a first direction in a plane parallel to said surface of said medium, said data tracks having a track width in a second direction in said plane, said second direction being perpendicular to said first direction at a point where said first and second directions meet, said medium comprising:

a recording layer in which information is to be recorded;

a reproducing layer to and from which information recorded in said recording layer is to be transferred and read out, said reproducing layer comprising a specific material such that, at room temperature, the stable magnetic domain width in said second direction is wider than the width in said second direction of the recorded magnetic domain formed in said recording layer and that, when the temperature of said reproducing layer is in a range of values higher than room temperature, said stable magnetic domain width of said reproducing layer becomes not greater than said width of said recorded magnetic domain of said recording layer;

wherein said reproducing layer has a perpendicular magnetic anisotropy at room temperature; and an intermediate layer, being interposed between said reproducing layer and said recording layer, which intensifies the intensity of magnetic coupling between said reproducing layer and said recording layer that are at a temperature within said range of values greater than the intensity of magnetic coupling between said reproducing layer and said recording layer that are at a temperature lower than said range of values.

* * * * *

UNITED STATES PATENT AND TRADEMARK OFFICE
CERTIFICATE OF CORRECTION

PATENT NO.: 5,932,364

DATED: August 3, 1999

INVENTOR(S): Hirokane et al.

It is certified that error appears in the above-identified patent and that said Letters Patent is hereby corrected as shown below:

On the Cover page, column 1, delete"[54] MAGNETO-OPTICAL RECORDING MEDIUM, METHOD OF RECORDING AND REPRODUCING INFORMATION IN AND FROM SAID MAGNETO-OPTICAL RECORDING MEDIUM AND METHOD OF PRODUCING SAID MAGNETO-OPTICAL RECORDING MEDIUM" and replace therewith --[54] MAGNETO-OPTICAL RECORDING MEDIUM HAVING SPECIFIC RELATIONSHIP BETWEEN MAGNETIC STABLE DOMAIN SIZES OF RECORDING AND REPRODUCING LAYERS--.

Signed and Sealed this

Eighteenth Day of January, 2000

*Attest:*

*Attesting Officer*

Q. TODD DICKINSON

*Commissioner of Patents and Trademarks*